(12) United States Patent
Allam et al.

(10) Patent No.: US 7,939,161 B2
(45) Date of Patent: May 10, 2011

(54) ENCAPSULATED PANEL ASSEMBLIES AND METHODS FOR MAKING SAME

(75) Inventors: Dominic Joseph Allam, Canton, MI (US); Marc A. Pocock, Orion Township, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 11/958,983

(22) Filed: Dec. 18, 2007

(65) Prior Publication Data

US 2008/0213545 A1    Sep. 4, 2008

Related U.S. Application Data

(60) Provisional application No. 60/870,643, filed on Dec. 19, 2006.

(51) Int. Cl.
*B32B 27/40* (2006.01)
*B29C 45/00* (2006.01)

(52) U.S. Cl. ......... 428/192; 264/328.1; 528/26; 525/44; 427/284

(58) Field of Classification Search .................. 264/233, 264/328.1; 216/65; 524/730, 731, 860–863; 522/99; 525/100–107, 44; 528/26; 427/284
See application file for complete search history.

(56) References Cited

U.S. PATENT DOCUMENTS

| | | | |
|---|---|---|---|
| 3,152,162 A | 10/1964 | Fischer et al. | |
| 3,549,396 A | 12/1970 | Dietz | |
| 3,743,626 A | 7/1973 | Emmons | |
| 4,072,340 A | 2/1978 | Morgan | |
| 4,122,074 A * | 10/1978 | Pepe et al. | 525/339 |
| 4,232,088 A | 11/1980 | Humphrey, Jr. | |
| 4,367,313 A | 1/1983 | Rizk | |
| 4,374,210 A | 2/1983 | Ewen et al. | |
| 4,374,237 A | 2/1983 | Berger et al. | |
| 4,385,133 A | 5/1983 | Alberino et al. | |
| 4,394,491 A | 7/1983 | Hoffman | |
| 4,396,681 A | 8/1983 | Rizk et al. | |
| 4,496,611 A | 1/1985 | Kawakubo | |
| 4,522,975 A | 6/1985 | O'Conner et al. | |
| 4,526,811 A | 7/1985 | Jialanella | |
| 4,561,625 A | 12/1985 | Weaver | |

(Continued)

FOREIGN PATENT DOCUMENTS

DE    19961632 A1 *    6/2001

(Continued)

OTHER PUBLICATIONS

Household Products Database Chemical Information: Hydroxymethyl methacrylate, Website accessed Jul. 29, 2009.*

(Continued)

*Primary Examiner* — Callie E Shosho
*Assistant Examiner* — Prashant J Khatri
(74) *Attorney, Agent, or Firm* — Dobrusin & Thennisch PC (57) ABSTRACT

A panel assembly, and method of making it, that includes a substrate and a coating proximate at least one edge of the substrate for defining a coated edge portion, the coating including one or more film forming resins having at least one functional group capable of polymerization; an initiator for causing the formation of free radicals or cations; and one or more compounds, which are reactive with the film forming resin and which also contain at least one acidic moiety. A plastic is bonded onto the coated edge portion of the substrate.

17 Claims, 2 Drawing Sheets

U.S. PATENT DOCUMENTS

| | | | |
|---|---|---|---|
| 4,643,794 | A | 2/1987 | Saracsan |
| 4,672,100 | A | 6/1987 | Schonbachler |
| 4,687,533 | A | 8/1987 | Rizk et al. |
| 4,688,752 | A | 8/1987 | Barteck et al. |
| 4,697,026 | A * | 9/1987 | Lee et al. ............... 556/418 |
| 4,735,830 | A | 4/1988 | Oezelli et al. |
| 4,761,916 | A | 8/1988 | Sanok et al. |
| 4,777,191 | A | 10/1988 | Komai et al. |
| 4,780,520 | A | 10/1988 | Rizk et al. |
| 4,816,132 | A | 3/1989 | Kotani et al. |
| 4,835,012 | A | 5/1989 | Saur |
| 4,839,122 | A * | 6/1989 | Weaver ............... 264/129 |
| 4,874,805 | A | 10/1989 | Mulhaupt et al. |
| 4,910,279 | A | 3/1990 | Gillis et al. |
| 4,912,306 | A | 3/1990 | Grise et al. |
| 4,950,581 | A | 8/1990 | Koke et al. |
| 4,963,614 | A | 10/1990 | Ito et al. |
| 4,970,244 | A | 11/1990 | Komai et al. |
| 4,999,136 | A | 3/1991 | Su et al. |
| 5,010,202 | A | 4/1991 | Greco |
| 5,063,269 | A | 11/1991 | Hung |
| 5,071,692 | A | 12/1991 | Jourdaine |
| 5,082,736 | A | 1/1992 | Bravet et al. |
| 5,114,989 | A | 5/1992 | Elwell et al. |
| 5,128,423 | A | 7/1992 | Parrinello |
| 5,139,307 | A | 8/1992 | Koops et al. |
| 5,167,899 | A | 12/1992 | Jezic |
| 5,279,882 | A | 1/1994 | Daude et al. |
| 5,368,943 | A | 11/1994 | Baghdachi et al. |
| 5,378,746 | A | 1/1995 | Beyrle et al. |
| 5,391,588 | A | 2/1995 | Sakamoto |
| 5,413,748 | A | 5/1995 | Garza |
| 5,466,727 | A | 11/1995 | Hsieh |
| 5,492,951 | A | 2/1996 | Beyrle et al. |
| 5,502,145 | A | 3/1996 | Szum |
| 5,529,655 | A | 6/1996 | Bravet |
| 5,554,217 | A | 9/1996 | Bäbler |
| 5,567,530 | A | 10/1996 | Drujon et al. |
| 5,603,798 | A | 2/1997 | Bhat |
| 5,623,044 | A | 4/1997 | Chiao |
| 5,637,363 | A | 6/1997 | Leroy et al. |
| 5,664,041 | A | 9/1997 | Szum |
| 5,716,571 | A | 2/1998 | LeLievre |
| 5,795,501 | A | 8/1998 | Kano |
| 5,801,515 | A | 9/1998 | Chen et al. |
| 5,840,428 | A | 11/1998 | Blizzard |
| 5,852,137 | A | 12/1998 | Hsieh et al. |
| 5,864,996 | A | 2/1999 | Veldman et al. |
| 5,915,780 | A | 6/1999 | Kobrehel et al. |
| 5,922,809 | A | 7/1999 | Bhat et al. |
| 5,948,927 | A | 9/1999 | Gunther |
| 5,976,305 | A | 11/1999 | Bhat et al. |
| 6,000,814 | A * | 12/1999 | Nestell et al. ............... 362/267 |
| 6,048,579 | A | 4/2000 | Wang et al. |
| 6,080,817 | A | 6/2000 | Thieben et al. |
| 6,126,737 | A | 10/2000 | Mason |
| 6,134,851 | A | 10/2000 | Roze et al. |
| 6,150,431 | A | 11/2000 | Miller et al. |
| 6,150,756 | A | 11/2000 | Wakelkamp et al. |
| 6,153,662 | A | 11/2000 | Miller et al. |
| 6,174,606 | B1 | 1/2001 | Brusic et al. |
| 6,228,433 | B1 | 5/2001 | Witt |
| 6,255,127 | B1 | 7/2001 | Fujino et al. |
| 6,290,881 | B1 | 9/2001 | Krohn |
| 6,302,681 | B1 | 10/2001 | Douche et al. |
| 6,306,924 | B2 | 10/2001 | Szum |
| 6,355,127 | B1 | 3/2002 | Mahdi et al. |
| 6,395,856 | B1 | 5/2002 | Petty et al. |
| 6,413,347 | B1 | 7/2002 | Hosaka et al. |
| 6,438,306 | B1 | 8/2002 | Bishop |
| 6,467,232 | B1 | 10/2002 | Mackey |
| 6,500,877 | B1 | 12/2002 | Krohn |
| 6,512,033 | B1 | 1/2003 | Wu |
| 6,592,998 | B2 | 7/2003 | Anderson et al. |
| 6,592,999 | B1 | 7/2003 | Anderson et al. |
| 6,596,445 | B1 | 7/2003 | Matsumoto et al. |
| 6,598,426 | B2 | 7/2003 | Vandal et al. |
| 6,623,791 | B2 | 9/2003 | Sadvary et al. |
| 6,649,016 | B2 | 11/2003 | Wu et al. |
| 6,653,394 | B1 * | 11/2003 | Meisenburg et al. ......... 524/589 |
| 6,675,541 | B2 | 1/2004 | Mackey |
| 6,713,000 | B2 | 3/2004 | Krohn |
| 6,747,602 | B2 | 6/2004 | Matsuoka et al. |
| 6,784,223 | B2 | 8/2004 | Krohn |
| 6,797,746 | B2 | 9/2004 | Cavazos-Gutierrez |
| 6,803,001 | B2 | 10/2004 | Ito et al. |
| 6,875,470 | B2 | 4/2005 | Trabesinger et al. |
| 6,946,628 | B2 | 9/2005 | Shirlin et al. |
| 6,974,500 | B2 | 12/2005 | Miyata et al. |
| 6,984,287 | B2 | 1/2006 | Zhang |
| 7,022,748 | B2 | 4/2006 | Wilke et al. |
| 7,024,822 | B2 | 4/2006 | Scheer et al. |
| 7,087,127 | B2 | 8/2006 | Mahdi et al. |
| 7,119,129 | B2 | 10/2006 | Krohn |
| 7,122,289 | B2 | 10/2006 | Wilke et al. |
| 7,123,202 | B2 | 10/2006 | Maeuser et al. |
| 7,129,444 | B2 | 10/2006 | Weiss |
| 7,138,347 | B2 | 11/2006 | Konno |
| 7,786,183 | B2 * | 8/2010 | Baikerikar et al. ............. 522/91 |
| 2001/0041782 | A | 1/2001 | Okuhira et al. |
| 2002/0086914 | A1 | 7/2002 | Lee et al. |
| 2002/0092601 | A1 | 7/2002 | Sweeney, Jr. |
| 2003/0084955 | A1 | 5/2003 | Zhang |
| 2003/0100676 | A1 | 5/2003 | Okuhira et al. |
| 2003/0105230 | A1 | 6/2003 | Hellmann |
| 2004/0106718 | A1 | 6/2004 | Krohn |
| 2004/0191521 | A1 | 9/2004 | Weiss et al. |
| 2004/0239008 | A1 | 12/2004 | Gottlieb et al. |
| 2005/0045103 | A1 | 3/2005 | Mikhael et al. |
| 2005/0051536 | A1 | 3/2005 | Shirlin et al. |
| 2005/0081995 | A1 | 4/2005 | Beckley |
| 2005/0113484 | A1 | 5/2005 | Kamen et al. |
| 2005/0126414 | A1 | 6/2005 | Weiss et al. |
| 2005/0126683 | A1 | 6/2005 | Hsieh |
| 2005/0154076 | A1 | 7/2005 | Bach |
| 2006/0025496 | A1 | 2/2006 | Grandhee et al. |
| 2006/0191625 | A1 | 8/2006 | Kapp et al. |
| 2006/0198963 | A1 | 9/2006 | Chernyshov et al. |
| 2006/0287408 | A1 | 12/2006 | Baikerikar et al. |
| 2008/0268259 | A1 | 10/2008 | Schmatloch |
| 2008/0269452 | A1 | 10/2008 | Schwoeppe |
| 2010/0316828 | A1 * | 12/2010 | Baikerikar et al. ............. 428/38 |

FOREIGN PATENT DOCUMENTS

| | | | |
|---|---|---|---|
| EP | 0106628 | | 10/1983 |
| EP | 0126541 | A1 | 11/1984 |
| EP | 0377444 | | 1/1990 |
| EP | 0468713 | A1 | 1/1992 |
| EP | 414375 | | 2/1993 |
| EP | 592138 | A | 4/1994 |
| EP | 0666290 | | 8/1995 |
| EP | 0687713 | | 12/1995 |
| EP | 1013726 | | 12/1999 |
| EP | 1153090 | | 12/2000 |
| EP | 1231241 | | 8/2002 |
| EP | 1382625 | A | 1/2004 |
| GB | 2113698 | A | 8/1983 |
| GB | 2147244 | A | 5/1985 |
| GB | 2271308 | A * | 4/1994 |
| GB | 2339571 | B | 1/2003 |
| JP | 61287476 | | 12/1986 |
| JP | 10036481 | A | 2/1998 |
| JP | 2002012635 | | 1/2002 |
| JP | 2002/309163 | A | 10/2002 |
| JP | 2002/309182 | A | 10/2002 |
| JP | 2003/128988 | A | 5/2003 |
| JP | 2003/226731 | A | 8/2003 |
| JP | 2003/336008 | A | 11/2003 |
| JP | 2004168957 | | 6/2004 |
| JP | 2007063551 | A | 3/2007 |
| WO | WO93/01293 | | 7/1993 |
| WO | WO95/23772 | | 3/1995 |
| WO | WO99/31191 | | 6/1999 |
| WO | 00/00530 | A1 | 1/2000 |
| WO | 00/06512 | A1 | 2/2000 |
| WO | WO01/51567 | | 1/2001 |
| WO | 01/44381 | A1 | 6/2001 |

| WO | WO01/44381 | 6/2001 |
| WO | 01/47644 A1 | 7/2001 |
| WO | 01/77245 A2 | 10/2001 |
| WO | WO03/062310 | 1/2003 |
| WO | WO03/106579 | 6/2003 |
| WO | WO2005/003048 | 1/2005 |
| WO | WO2005/040055 | 5/2005 |
| WO | WO2005/052071 | 6/2005 |
| WO | WO2006/093671 | 2/2006 |
| WO | 2006/042305 A1 | 4/2006 |
| WO | WO2007/002328 | 1/2007 |
| WO | 2008/036721 | 3/2008 |
| WO | 2008036721 | 3/2008 |
| WO | 2008/045726 A | 4/2008 |

OTHER PUBLICATIONS

Essex Specialty Products 435.20 MSDS (1985).*

Copending U.S. Appl. No. 12/033,420 (U.S. Appl. No. 60/913,700), filed Apr. 24, 2007.

Copending U.S. Appl. No. 12/035,770 (U.S. Appl. No. 60/949,369), filed Dec. 18, 2007.

Copending U.S. Appl. No. 11/959,208 (U.S. Appl. No. 60/870,639), filed Dec. 18, 2007.

Copending U.S. Appl. No. 11/959,107 (U.S. Appl. No. 60/870,641), filed Dec. 18, 2007.

Copending U.S. Appl. No. 12/041,915 (U.S. Appl. No. 60/913,703), filed Mar. 4, 2008.

Copending U.S. Appl. No. 12/033,447 (U.S. Appl. No. 60/913,706), filed Feb. 19, 2008.

Copending U.S. Appl. No. 61/014,547, filed Dec. 18, 2007, by Baikerikar et al., "Protective Coating for Window Glass Having Enhanced Adhesion to Glass Bonding Adhesives."

Copending U.S. Appl. No. 11/472,119, filed Jun. 20, 2006, (Published as 2006-0287408).

LORD: "AP-134 Product information".

International search report, International application No. PCT/US2007/087940, mailed May 19, 2008.

* cited by examiner

ENCAPSULATED PANEL ASSEMBLIES AND METHODS FOR MAKING SAME

CLAIM OF PRIORITY

The present application claims the benefit of the filing date of Provisional Application No. 60/870,643 (filed Dec. 19, 2006), the contents of which are hereby incorporated by reference in their entirety.

FIELD OF THE INVENTION

This invention relates to encapsulated panel assemblies, and particularly to encapsulated transparent substrates for use as a window of a transportation vehicle.

BACKGROUND OF THE INVENTION

In the field of automotive glass applications, one approach for manufacturing vehicle window assemblies (e.g., flush mount window assemblies) is to apply a frit to a peripheral edge of a transparent panel, apply a primer over the frit, locate the panel in a cavity of a mold, and fill the mold with a plastic for selectively covering the peripheral edges of the panel, while leaving a transparent interior portion of the panel, for use as a window. Other approaches have contemplated applying a gasket or frame adjacent to at least the peripheral edge of the panel and to bond it to the panel using a primer and possibly an adhesive too.

Examples of various approaches to the manufacture of panel assemblies that are generally encapsulated or include a peripheral frame or gasket are shown in U.S. Pat. Nos. 4,072,340; 4,561,625; 4,688,752; 4,761,916; 5,082,736; 5,139,307; 5,279,882; 5,413,748; 5,637,363; 5,716,571; 5,807,515; 5,915,780; 6,134,851; 6,302,681; 6,467,232; 6,675,541; 6,803,001, all of which are hereby incorporated by reference.

One approach to facilitating the manufacture of these assemblies is exemplified in U.S. Pat. No. 6,984,287, incorporated by reference. See also, U.S. Pat. No. 4,232,088, incorporated by reference.

It would be attractive to have a technique for manufacturing panel assemblies, particularly those including one or more of an encapsulated edge, a metal bracket, plastic bracket or frame adhered via an adhesive, and particularly a technique that avoids the need to apply both a ceramic frit and a primer.

SUMMARY OF THE INVENTION

The invention generally relates to a panel assembly, and method of making it, that includes a substrate and a coating proximate at least one edge of the substrate for defining a coated edge portion, the coating including one or more film forming resins having at least one functional group capable of polymerization; an initiator for causing the formation of free radicals or cations; and one or more compounds, which are reactive with the film forming resin and which also contain at least one acidic moiety. A plastic is bonded onto the coated edge portion of the substrate.

In a more specific aspect, the invention is directed to a panel assembly, and method of making it, including a substrate including a peripheral edge portion that substantially surrounds a generally transparent central portion, the substrate being selected from glass, plastic or any combination thereof. A coating is applied directly on the substrate in the peripheral edge portion for defining a coated edge portion, the coating including a (meth)acrylate and a siloxane functionality, and a photoinitiator. A plastic selected from a polyurethane, a polyvinylchloride, a thermoplastic polyolefin, a polyolefin, or any combination thereof is applied (e.g., molded, extruded or otherwise applied in a fluidic state) onto the coated edge portion of the substrate.

In yet another specific aspect, the invention is directed to a panel assembly, and method of making it, that includes a substrate including a peripheral edge portion that substantially surrounds a generally transparent ultraviolet radiation-protected central portion, the substrate being selected from glass, plastic or any combination thereof. A coating is applied directly on the substrate in the peripheral edge portion for defining a coated edge portion, the coating including a (meth) acrylate, a high molecular weight adhesion promoter (e.g., Michael adduct) having multiple alkoxysilanes, a photoinitiator, and an acid. Desirably the coating is a radiation cured coating. A plastic selected from a polyurethane, a polyvinylchloride, a thermoplastic polyolefin, a polyolefin, or any combination thereof, is molded onto the coated edge portion of the substrate.

In one specific aspect, the methods and articles herein contemplate that the coating (and possibly even the entire encapsulated joint of the assembly) is substantially free of any crystalline and/or amorphous ceramic or other inorganic phase other than the material of the encapsulated substrate, e.g., the assembly is substantially free of any ceramic frit beneath the plastic. Other variations of the above are contemplated as well, as will be appreciated from a review of the following detailed description. It will be seen that the present invention has the potential to afford various benefits, including one or more of the avoidance of high temperature firing steps (e.g., the present invention avoids the need to subject the coating or substrate to a firing step in excess of about 600° C., more specifically in excess of about 400° C., and still more specifically in excess of about 250° C., or another temperature that would degrade the material such as by decomposition, melting or otherwise), the reduction of overall steps (e.g., by the elimination of the requirement of employing separately a frit application and a primer application), the avoidance of special high temperature handling steps for additional ceramic coatings applied to the substrate, the ability to thermally deform substrates after the application of the coating composition, or any combination thereof. Resulting articles are capable of exhibiting excellent long-term performance, in one or more particular respects, such as encapsulation joint bond integrity, dimensional stability, sealing capability or any combination thereof.

DETAILED DESCRIPTION

As used herein, all parts by weight are based on 100 parts by weight of the recited base material or composition. In a case of the coating composition, this means the weights are based on 100 parts by weight of the overall coating composition. It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1.

In general, the present invention is directed to an improved assembly that includes a substrate of a first material and a second material (that is preferably polymeric) attached over at least a portion of an outer surface of the substrate. Though the second material can be located anywhere on the outer surface of the substrate, one specific embodiment contemplates that it is located along at least one edge portion of the substrate. For the preferred automotive applications herein, the substrate generally will be a relatively thin panel having generally opposing parallel outer surfaces that are flat, arcuate, or a combination of both. The substrate will include an edge portion that substantially adjoins (and may even at least partially surround) a transparent portion. Thus, it is possible that the substrate will be an at least partially transparent panel, such as a window, and specifically a panel made from glass, plastic or a combination thereof. The substrate thus may further include one or more additional art-disclosed layers (e.g., for resisting abrasion, for resisting ultraviolet radiation, for containing fragments in the event of breakage, for heating, for use as an antenna, or any combination thereof). An example of one approach to treating substrates for making a heater, an antenna and/or another conductive element is disclosed in commonly owned U.S. Provisional Application No. 60/870,639; (filed Dec. 19, 2006) entitled: "Improved Composites And Methods For Conductive Transparent Substrates", and U.S. application Ser. No. 11/959,208, filed Dec. 19, 2007, entitled: "Improved Composites and Methods for Conductive Transparent Substrates" the contents of which are hereby incorporated by reference in their entirety. The substrate may also include a coating composition as described in U.S. Provisional Application No. 60/870,641; (filed Dec. 19, 2006) entitled: "Adhesion promotion additives and Methods For Improving Coating Compositions," and U.S. application Ser. No. 11/959,107, filed Dec. 18, 2007, entitled "Adhesion promotion additives and Methods For Improving Coating Compositions," the contents of which are hereby incorporated by reference in their entirety. Furthermore, the substrate may also include a coating composition as described in U.S. Provisional Application No. 61/014,547 filed Dec. 18, 2007 by Baikerikar et al., entitled "Protective Coating For Window Glass Having Enhanced Adhesion To Glass Bonding Adhesives," the contents of which are hereby incorporated by reference in their entirety.

In a particular aspect, the second material is configured for functioning as one or more of a frame for the substrate, a gasket for the substrate, a means for attaching or locating the substrate relative to another structure, a structural reinforcement for the substrate, or any combination thereof. The second material thus may be disposed over one or both of the opposing faces of the substrate, and may also cover an edge of the substrate. The second material may be disposed about only a portion of the periphery of the substrate or about substantially the entirety of the periphery of the substrate. Any portion of the substrate that is covered by the second material will be regarded herein as generally being encapsulated by the second material, with the combination of the encapsulated portion of the substrate and any coating being the encapsulation joint. For use in an automotive vehicle window opening, the second material may be configured for achieving a substantially flush mount relative to the adjoining vehicle structure.

In many automotive applications it is also possible that located in or adjacent the edge portion there may be a frit printed onto the substrate or otherwise applied. As will be seen, one of the advantages of the present invention is that the coating compositions described herein can be employed as such frit material, or in addition to such frit material. When so employed, it is possible (though not mandatory) that a separate primer layer can be avoided for achieving a tenacious bond between the second material, the coating composition and the substrate. Thus, the present invention contemplates the manufacture of articles that include or consist essentially of a substrate, the coating composition herein disposed over at least a portion of the substrate (e.g., proximate the edge), and a second material attached to (e.g., overmolded onto) the substrate for at least partially covering the coating composition. Encapsulated panels may thus be realized.

The second material may be any suitable material for encapsulation of substrates. Desirably it is a plastic, and may be a thermoplastic, a thermoset or a combination thereof. The second material may be filled or reinforced with particles, fibers or otherwise. The second material may be employed alone or in combination with one or more additional materials, such as concealed and/or exposed inserts, fascia or other decorative and/or functional exterior trim, combinations thereof or otherwise.

In one preferred embodiment, the second material includes a polymer selected from polyvinylchloride, polyurethane, polyurea, or any combination thereof. A specific preferred material is a plastic suitable for reaction injection molding ("RIM").

Suitable art-disclosed methods may be employed for attaching the second material to the substrate. It is possible that they will be attached by an adhesive, by mechanical attachment or both. One particular approach is to apply the coating composition herein to the substrate and to contact the substrate with the second material, such that the coating composition is in direct contact with at least one, and more preferably both, of the substrate and the second material.

For preferred embodiments herein, the second material is contacted with at least the coating composition while the second material is in a substantially fluid state (e.g., it is a liquid or even a high viscosity fluid, such as might be encountered during processing of molten plastics or plastics reacted from liquid ingredients). Thus, one approach herein envisions contacting at least the coating composition while the second material is (at time of contact) at an elevated temperature relative to room temperature. This can be achieved, for example, during a step of injection molding the second material, a step of extruding the second material, or possibly even during a step of thermoforming the second material.

As indicated, one preferred approach is to contact the materials during a step of reaction injection molding the coated substrate with the second material.

The second material is desirably selectively located over only a portion of the substrate, such as along one or more edges, or about substantially the entire periphery of the substrate. For the preferred applications herein for automotive window assemblies, the second material will be located along one or more edges, or about substantially the entire periphery of the substrate, such that it results in a substantially transparent portion, e.g. a substantially transparent central portion.

For reaction injection molding, it is possible to employ art-disclosed molding techniques, such as reaction injection molding techniques. In general, the substrate is placed in a mold defined for including a cavity adjacent the regions for which an encapsulated profile is sought. A plastic (specifically, the precursor reactants in the case of reaction injection molding) is injected in a fluidic state into the mold for filling the cavity. The plastic solidifies, reacts and hardens, or a combination thereof, and the mold is opened. The encapsulated assembly is then removed. Other optional steps may include placing one or more brackets, pins or other members into the mold at predetermined locations to register them on the encapsulated assembly, one or more of pressurizing (and thereafter de-pressurizing) the mold for increasing the pressure during injection, applying a mold release agent to the substrate and/or one or more portions of the mold cavity, heating the mold, cooling the mold, cleaning the substrate and/or assembly, trimming flash from the resulting assembly, or any combination thereof.

The assemblies herein may further include one or more additional hardware components, including but not limited to a bracket, a latch, striker, a locating member, a hinge, a pivot, a fastener, a post, a strap or any combination thereof. The hardware components may be secured in place such as by embedding them during molding (e.g., insert molding), by fastening, by adhering, or any combination thereof. When securing the hardware in place by adhering, it is possible that the coating composition described herein is applied on the substrate, and an adhesive is applied to the coating composition for bonding to the hardware. The hardware itself may be coated or uncoated. If coated, it may include the coating composition herein. The hardware that is in contact with the adhesive thus may include an unpainted plastic, an unpainted metal, a painted plastic, a painted metal or any combination thereof. Hardware may also comprise a ceramic material, a carbon fiber or a composite of the same with or without a metal and/or plastic.

The assemblies herein may be adapted for temporary or permanent mounting to a structure. The assemblies may be adapted for opening, closing, or otherwise translating, e.g., by sliding, by articulating (see, e.g., U.S. Pat. No. 7,024,822, incorporated by reference), by pivoting, by folding, or any combination thereof. The assemblies thus may be employed in one or more applications such as automotive vehicle backlights, side windows, sun/moon roofs, architectural windows, skylights, portholes, door openings, display cases, or otherwise.

The substrates herein, in one particular aspect, may be transparent (i.e., optically transparent) over at least a portion of its volume. For example, because the invention herein is particularly useful for encapsulating to a window or other panel (e.g., an automotive windshield, backlight, sidelight, light lens, mirror, sun roof, gauge lens, or the like), typically, the substrates will be panels that are transparent through at least one surface, and particularly through both opposing surfaces, over at least about 25% of the area of the surface, and more specifically, at least a majority (e.g., at least about 60%, 75% or even 90% of the area of the surface).

The substrates herein generally will be made from a substantially amorphous material, and particularly an amorphous ceramic (such as glass), a plastic, or a combination thereof. Without limitation, examples of suitable substrate materials include poly(meth)acrylates, polycarbonates, vinyls, polyesters (e.g., oriented polyesters), polyimides, polyolefins, polyamides, glass, any combinations thereof (e.g. a laminated glass), or the like. In a particular example, the substrates include or even consist essentially of a material selected from glass, poly(meth)acrylates, polycarbonates or any combination thereof. Illustrative materials are also described at cols. 11-12 of U.S. Pat. No. 7,129,444 (incorporated by reference).

The substrates herein typically will include at least one surface onto which the coating composition is applied. The surface may optionally be treated for improving the bond strength of the coating to the substrate, e.g. by a primer, a flame spray, a corona treatment, a plasma treatment, or some other surface treatment. However, in one specific example, the outer surface is substantially free of any surface treatment. Accordingly, upon application, the coating composition is in direct intimate contact with the substrate, and particularly in the substantial absence of any intermediate layer. Of course, after applying the composition to the substrate it is also possible to apply over some or all of one or both of the composition and substrate a further layer (e.g., a silicone, an acrylic, a polyurethane, or otherwise, for realizing a protective overlayer), such as is disclosed in columns 12-14 of U.S. Pat. No. 7,129,444 (incorporated by reference). It is also possible that the coating composition herein may be employed over, beneath and/or adjacent a frit (e.g., a frit of the type taught in co-pending application Ser. No. 11/472,119 filed Jun. 20, 2006 (priority to 60/692,318 filed Jun. 20, 2005), by Baikerikar et al. (incorporated by reference).

When applied, the coating composition herein generally will have a thickness of up to about 250 microns or higher. More commonly it will be less than about 150 microns, less than about 100 microns or even less than about 50 microns (e.g., about 10 to about 30 microns or smaller).

Though some applications may call for the coating of substantially an entire surface of a substrate with the coating composition herein, ordinarily the coating compositions will be applied to the substrates selectively, according to a predetermined pattern (e.g., substantially along an edge portion of the substrate, about the periphery of the substrate, or otherwise). For example, one approach is to apply the coating from the edge of the substrate inwards toward the central portion in a width of about 2, 5, 8, or even 12 cm or greater. It is also possible that the coating composition will may be applied for defining one or more lines, curves, dots, or other geometric configurations comprising segments of constant or varying width height, length or other dimension. For example, the coating composition can be applied to have a frit pattern.

For a particular aspect of the invention, the coating composition is one that is capable of being applied to a substrate as a liquid, a paste or a combination thereof. Thereafter, it hardens, and also bonds to the substrate, while affording generally abrasion resistant, thermally stable, and light stable composition such that it may be advantageously employed in environments common for automotive applications.

One preferred coating composition preferably includes one or more film forming resins having at least one functional group capable of polymerization; one or more reactive diluents capable of reacting with the film forming resin; one or more silicon, titanium zirconium, aluminum, or metal containing compounds capable of promoting adhesion of the composition to glass; and one or more compounds which is reactive with the film forming resin which also contains at least one acidic moiety.

Turning first to the film forming resin, generally it will contain one or more moieties able to polymerize, curing to form a continuous coating and which is resistant to many environmental forces. In a preferred embodiment, preferably the film-forming resin polymerizes when exposed to free radicals or to cationic reaction conditions. In one specific aspect, the film-forming resin is a resin curable by exposure to irradiation, such as UV radiation or an electron beam. The film-forming resin may contain functional groups which polymerize when exposed to free radicals, such as vinyl, acrylate, styrenic, diene, methacrylate, allyl, thiolene, vinyl ether, unsaturated ester, imide, N-vinyl, acrylamide containing moieties, mixtures thereof or the like. In a more preferred embodiment, the functional groups on the film-forming resin are acrylic and/or methacrylic moieties. In many embodiments, the film-forming resin is an oligomer or prepolymer having the described functional moieties. Among preferred types of oligomers and prepolymers are urethane acrylates, such as aliphatic and aromatic urethane acrylates, epoxy acrylates, melamine acrylates, polyester acrylates, polyether acrylates, silicone acrylates, dendritic acrylates, polybutadiene acrylates, amine or amido acrylates, acrylic acrylates, metallic acrylates (zinc containing acrylates), amido acrylates, chlorinated polyester acrylates, allylic oligomers, anhydride/carboxylic acid-containing aromatic acid acrylate/methacrylate half ester oligomers, hyperbranched acrylates, imide/ester/amide-containing acrylates self-initiating oligomers (e.g., oligomers that use small amounts or substantially no photoinitiator), acrylated phenoxy oligomers, acrylamidomethyl substituted cellulose esters, dual-functional acrylated oligomers (i.e. containing acrylates and either hydroxyl, isocyanate, carboxylic acid, anhydride, or epoxy groups), and spiro ortho carbonate esters or mixtures thereof. One specific class of oligomers and prepolymers includes aliphatic urethane acrylates, commercial examples of which include those from Cytec Surface Specialties under the trademark EBECRYL and designations 264, 265, 284N, 1290, 4866, 8210, 8301, 8402, 8405, 5129 and 8411; those available from Sartomer under the designations CN985B88, 964, 944B85, 963B80, CN 929, CN 996, CN 968, CN 980, CN 981, CN 982B90, CN 983, CN991; CN 2920, CN 2921, CN 9006, CN 9008, CN 9009, CN 9010, CN964A85, CN 9001, CN 2920; GENOMER 4302, 4316, and UA 00-022 available from Rahn; PHOTOMER 6892 and 6008 available from Cognis; NK OLIGO™ U24A and U-15HA, and U-324A™ available from Kowa. Additional suppliers of aliphatic urethane acrylates include the BR series of aliphatic urethane acrylates such as BR 144 or 970 available from Bomar Specialties or the LAROMER series of aliphatic urethane acrylates, such as LAROMER 8987 from BASF.

The film-forming resin is present in an amount of about 10 parts by weight or greater and more preferably about 15 parts by weight or greater, based on the weight of the coating composition. Preferably, the film-forming resin is present in the composition in an amount of about 70 parts by weight or less based on the weight of the coating composition and more preferably about 60 parts by weight or less, more preferably about 50 parts by weight or less and most preferably 40 parts by weight or less of the coating.

The composition optionally may further comprise a reactive diluent in sufficient amounts to achieve the desired viscosity. The reactive diluent may be monofunctional or polyfunctional, as those terms are described in co-pending application Ser. No. 11/472,119 filed Jun. 20, 2006 (priority to 60/692,318 filed Jun. 20, 2005), by Baikerikar et al. (incorporated by reference). Preferably, the reactive diluent has unsaturated compounds which polymerize when exposed to free radicals or compounds which react via cationic reaction mechanisms. Examples of functional moieties which may be used in the reactive diluent include vinyl, acrylate, styrenic, diene, methacrylate, allyl, acrylamide, methacrylamide, cycloaliphatic epoxide, alpha epoxide, acrylonitrile, and methacrylonitrile containing moieties, combinations thereof or the like. Preferred functional groups are those functional groups which polymerize when exposed to free radicals. Among preferred functional groups which polymerize when exposed to free radicals are vinyl, acrylate, styrenic, diene, methacrylate, and allyl containing moiety, combinations thereof and the like. Representative examples of monofunctional reactive diluents useful include styrene, alpha methylstyrene, substituted styrene, vinyl ester, vinyl ether, N-vinyl-2-pyrrolidone, (meth)acrylamide, N-substituted (meth) acrylamide, octyl(meth)acrylate, nonylphenol ethoxylate (meth)acrylate, isononyl(meth) acrylate, isobornyl(meth) acrylate, 2-(2-ethoxyethoxy)ethyl(meth)acrylate, 2-ethylhexyl (meth)acrylate, lauryl(meth)acrylate, beta-carboxyethyl (meth)acrylate, isobutyl (meth)acrylate, 3,3,5-trimethylcyclohexyl(meth)acrylate, cyclic trimethylolpropane formal (meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl(meth)acrylate, n-butyl (meth)acrylate, methyl (meth)acrylate, hexyl(meth)acrylate, (meth)acrylic acid, N-vinylcaprolactam, N-vinylformamide, stearyl(meth)acrylate, hydroxy functional caprolactone ester (meth)acrylate, isooctyl(meth)acrylate, hydroxyethyl(meth)acrylate, hydroxymethyl (meth)acrylate, hydroxypropyl(meth)acrylate, hydroxyisopropyl(meth)acrylate, hydroxybutyl (meth) acrylate, hydroxyisobutyl(meth)acrylate, tetrahydrofurfuryl (meth)acrylate, combinations of these, and the like. In one preferred embodiment, the reactive diluent is a monofunctional acrylate. Among preferred monofunctional acrylates are 2-(2-oxy)ethyl acrylate, 2(2-ethoxyethoxy)ethyl acrylate, 2-phenoxy ethyl acrylate, hydroxylethyl acrylate, other long chain alkyl acrylates, isobornyl acrylate, cyclic trimethylol propane formal acrylate, 3,3,5-trimethylcyclohexyl(meth)acrylate, monofunctional aliphatic urethane acrylates, mixtures thereof and the like. In a more preferred embodiment, the reactive diluent is a polyacrylate. Examples of polyacrylate reactive diluents include ethylene glycol di(meth)acrylate, hexanediol di(meth)acrylate, triethylene glycol di(meth)acrylate, nonanediol di(meth)acrylate, butylene glycol di(meth)acrylate, tetraethylene glycol di(meth)acrylate, dipropylene glycol di)meth)acrylate, trimethylolpropane tri(meth)acrylate, ethoxylated trimethylolpropane tri(meth) acrylate, glycerol tri(meth)acrylate, pentaerythritol tri(meth) acrylate, pentaerythritol tetra(meth)acrylate, tris(2-hydroxylethyl)isocyanurate triacrylate ditrimethylolpropane tetra (meth)acrylate, and alkoxylated polyol derived di or polyacrylates, such as propoxylated neopentyl glycol diacrylate or propoxylated glycerol triacrylate, neopentyl glycol di(meth)acrylate, combinations of these, and the like. Preferred reactive diluents are diacrylates such as 1,6 hexanediol diacrylate, 1,9 nonanediol diacrylate, 1,4 butanediol acrylate, tricyclodecane dimethanol diacrylate, cyclohexane dimethanol diacrylate, cis/trans 1,3/1,4 cyclohexanedimethanol diacrylate, alkoxylated cyclohexane dimethanol diacrylates, tripropylene glycol diacrylate and the like. More preferred reactive diluents include propoxylated neopentyl glycol diacrylate, propoxylated glyceryl triacrylate and tripropylene glycol diacrylate. Among the most preferred monofunctional acrylate monomers is isobornyl acrylate. If no free radical inhibitor is used to stabilize the liquid compositions, then propoxylated neopentyl glycol diacrylate and propoxylated glyceryl triacrylate, may be used as the reactive diluent.

Preferably, the reactive diluent is present in an amount of about 2, more preferably about 5 and still more preferably about 10 parts by weight or greater, based on the weight of the coating composition. The reactive diluent is preferably present in an amount of about 30, more preferable about 25 and still more preferably about 20 parts by weight or less, based on the weight of the coating composition.

In a preferred embodiment, a mixture of reactive diluents may be used, such as a blend of monofunctional, difunctional, and trifunctional diluents. Preferably, in such instance, any reactive diluent with a functionality of greater than 2 is present in an amount of about 1 part by weight of the coating or greater, more preferably about 3 parts by weight or greater and most preferably about 4 parts by weight or greater. Preferably, the reactive diluent having a functionality greater than 2 is present in an amount of about 15 parts by weight or less and more preferably about 12 parts by weight or less and most preferably about 10 parts by weight or less of the coating.

The coating composition may further contains one or more adhesion promoter(s), as described in co-pending application Ser. No. 11/472,119 filed Jun. 20, 2006 (priority to 60/692, 318 filed Jun. 20, 2005), by Baikerikar et al., the contents of which are hereby incorporated by reference in their entirety, capable of enhancing the bonding of the coating composition to glass, plastic and/or an isocyanate or siloxy functional adhesive. Adhesion promoters, in a non-limiting embodiment, can be monomers, oligomers and/or polymers. Such materials include, but are not limited to, organometallics such as silanes, (e.g., mercapto silanes, acrylate or methacrylate functional silanes, vinyl silanes, amino silanes, epoxy silanes, isocyanate silanes, fluoro silanes, and alkyl silanes), titanates, zirconates, aluminates, metal containing compounds, zirconium aluminates, hydrolysates thereof and mixtures thereof. In one aspect, they may include a compound including at least one terminal unsaturation (e.g. an acrylate group) and multiple alkoxysilyl groups.

The adhesion promotion additive may be synthesized by any of a number of reactions. Thus, the adhesion promotion additive may be prepared by a reaction of a first compound including at least one terminal unsaturation (e.g., an acrylate) and a second compound including one or more silylated groups (e.g., multiple alkoxysilyl groups). By way of example, the adhesion promotion additive may be the reaction product of a first compound including silicon and a moiety selected from at least one of a mercapto group, an amino group, an epoxy group, a hydroxyl group, a sulfoethyl group, an isocyanate group, a (meth)acrylate group, or any combination thereof, with a second compound including a moiety selected from at least one of an isocyanate group, a hydroxyl group, a carboxyl group, a mercapto group, an epoxy group, an acetoacetoxy group, a (meth)acrylate group, and amino group, or any combination thereof, with a second compound including a moiety selected from at least one of an isocyanate group, a hydroxyl group, a carboxyl group, a mercapto group, and amino group, or any combination thereof. By way of more specific examples, one or more of the following synthesis reactions may be suitably employed for preparing the adhesion promotion additive:

a. mercapto silane+isocyanate functional acrylate or methacrylate (e.g., so as to include a reaction between —SH and —NCO)

b. amino silane+isocyanate functional acrylate or methacrylate (e.g., so as to include a reaction between —NH or —NH2 with —NCO)

c. isocyanate silane+hydroxyl functional acrylate or methacrylate (e.g., so as to include a reaction between —NCO and —OH)

d. epoxy silane+amine functional acrylate or methacrylate (e.g., so as to include a reaction between epoxy and amine)

e. epoxy silane+carboxylic acid functional acrylate or methacrylate (e.g., so as to include a reaction between epoxy and —COOH)

f. mercapto acid+isocyanate functional acrylate or methacrylate (e.g., so as to include a reaction between —NCO with either/both —SH or —COOH)

g. Michael addition of amino silane+carboxylic acid functional acrylate or methacrylate (e.g., so as to include a reaction between the terminal double bond and amine; thus the product would contain both alkoxysilyl and —COOH functionality with a terminal acrylate in the same molecule);

h. amino silane+epoxy functional (meth)acrylate or methacrylate, such as glycidyl methacrylate (e.g., so as to include a reaction between epoxy and amine)

i. isocyanate silane+amine acrylate or methacrylate (e.g., so as to include a reaction between —NH or —NH2 with —NCO)

j. 2-sulfoethyl acrylate or methacrylate+isocyanate silane (e.g., so as to include a reaction between —SO2OH+—NCO)

k. hydroxy silane+isocyanate functional acrylate or methacrylate (e.g., so as to include a reaction between —NCO and —OH)

l. mercapto silane+epoxy functional (meth)acrylate such as glycidyl methacrylate (e.g., so as to include a reaction between —SH with epoxy)

m. epoxy silane+hydroxyl functional (meth)acrylate (e.g., so as to include a reaction between epoxy and —OH)

n. hydroxy silane+epoxy functional (meth)acrylate (e.g., so as to include a reaction between —OH with epoxy)

o. isocyanate silane+acetoacetoxy functional (meth)acrylate (e.g. so as to include a reaction between —NCO and active methylene group of acetoacetoxy functionality)

p. amino silane+acetoacetoxy functional (meth)acrylate (e.g. so as to include a reaction between amine and carbonyl group of acetoacetoxy functionality)

q. meth(acrylate) silane+acetoacetoxy functional (meth)acrylate (e.g. so as to include a Michael reaction between unsaturation from silane with active methylene group of acetoacetoxy functionality);

r. hydroxyl silane+carboxylic acid functional (meth)acrylate (e.g. so as to include a reaction between hydroxyl and carboxylic acid).

s. amino silane+polyacrylates (e.g. so as to include a Michael reaction between amine and acrylate); or t. amino silane+acryloyl or methacryloyl chloride (e.g. so as to include a reaction between an amine and chlorine to form an amide);

u. amino silane+carboxylic acid functional (meth)acrylate (e.g. so as to include a reaction between an amine and carboxylic acid to form an amide); or v. any combination of the foregoing.

Examples of titanate, zirconate or zircoaluminate adhesion promoters useful in this invention include those described in Wu et al., U.S. Pat. No. 6,649,016, column 7, line 23 to column 8, line 53, incorporated herein by reference. Preferred titanium adhesion promoters include those commercially available under the TYZOR name from DuPont or tetra (2,2 diallyoxymethyl)butyl, di(ditridecyl)phosphito titanate (e.g., KR 55, from Kenrich Petrochemicals, Inc.); neopentyl(diallyl)oxy, trineodecanonyl titanate; neopentyl(diallyl)oxy, tri (dodecyl)benzene-sulfonyl titanate; neopentyl(diallyl)oxy, tri(dioctyl)phosphato titanate; neopentyl(diallyl)oxy, tri(dioctyl)pyro-phosphato titanate; neopentyl(diallyl)oxy, tri(N-ethylenediamino)ethyl titanate; neopentyl(diallyl)oxy, tri(m-amino)phenyl titanate; neopentyl(diallyl)oxy, trihydroxy caproyl titanate; isopropyldimethylacrylisosteroyl titanate; tetraisopropyl(dioctyl)phosphito titanate; at least partial hydrolysates thereof or mixtures thereof.

Preferred zirconium adhesion promoters include zircon aluminates. Non-limiting examples of zirconate adhesion promoters include tetra (2,2 diallyloxymethyl)butyl, di(ditridecyl)phosphito zirconate (commercially available as KZ 55 from Kenrich Petrochemicals, Inc.); neopentyl(diallyl)oxy, trineodecanoyl zirconate; neopentyl(diallyl)oxy, tri (dodecyl)benzene-sulfony zirconate; neopentyl(diallyl)oxy, tri(dioctyl)phosphato zirconate; neopentyl(diallyl)oxy, tri (dioctyl)-pyrophosphato zirconate neopentyl(diallyl)oxy, tri (N-ethylenediamino)ethyl zirconate; neopentyl(diallyl)oxy, tri(m-amino)phenyl zirconate; neopentyl(diallyl)oxy, trimethacryl zirconate; neopentyl(diallyl)oxy, triacryl zirconate; dineopentyl(diallyl)oxy, diparamino benzoyl zirconate;

dineopentyl(diallyl)oxy, di(3-mercapto)propionic zirconate; at least partial hydrolysates thereof or mixtures thereof.

The silicon-containing adhesion promoter is one or more of a polysiloxane (see, e.g., U.S. Pat. No. 5,502,045 at column 2, lines 8-20 and at column 3, lines 3-54, incorporated herein by reference); a tetraorthosilicate (see, e.g., U.S. Pat. No. 6,306,924 at column 2, lines 26-39 and column 3, lines 24-42, incorporated herein by reference); or a multifunctional silane (see, e.g., U.S. Pat. No. 6,355,127 at column 21, lines 44 to column 22, line 38, incorporated herein by reference) or adhesion promoters that are reaction products of these silanes and other intermediates. Mixtures of any of these are possible as well.

Non-limiting examples of silane coupling agents include: vinyltriacetoxysilane, vinyltrimethoxysilane, vinyltriethoxysilane, vinyltri(2-methoxyethoxy)silane, vinyltriphenoxysilane, vinyltriisopropoxysilane, vinyltri-t-butoxysilane, divinyldiethoxysilane, y-glycidoxypropyltrimethoxysilane, allyltriethoxysilane, allyltrimethoxysilane, (3-acryloxypropyl)dimethylmethoxysilane, (3-acryloxypropyl)-methyldimethoxysilane, (3-acryloxypropyl)trimethoxysilane, (methacryloxy-methyl)dimethylethoxysilane, methacryloxymethyltriethoxysilane, methacryl-oxymethyltrimethoxysilane, methacryloxypropyldimethylethoxysilane, methacryl-oxypropyltrimethoxysilane, styrlethyltrimethoxysilane, mercaptomethyl-methyldiethoxysilane, 3-mercaptopropylmethyldimethoxysilane, 3-mercaptopropyl-triethoxysilane, 3-mercaptopropyltrimethoxysilane, and amino silanes, such as aminopropyltrimethoxysilane, bis(3-trialkoxysilylpropyl)amine, bis(trimethoxysilyl)propyl amine, (bis(3-trimethoxysilylpropyl) amine), or bis(triethoxysilyl)propyl amine; at least partial hydrolysates thereof or mixtures thereof. One preferred bis(3-trialkoxysilylpropyl)amine is commercially available under the name of SILQUEST A-1170 from GE Silicones, DYNASYLAN 1122 from Degussa or Z-6016 from Dow Corning. Once the adhesion promoter ingredient has been added, the formulation is mixed once again to form the coating composition. In a preferred embodiment, the composition comprises either one or both of at least two silane adhesion promoters, one selected from the group of polysiloxanes and tetraorthosilicates and a second selected from a group of multifunctional silanes.

Preferred tetraalkylorthosilicates are described by the following formula:

where A is Si, and where X (which may be the same or different each occurrence) is separately in each occurrence hydrolyzable groups that can be hydrolyzed from the tetra-substituted compound in the presence of water. Examples of hydrolyzable groups include, but are not limited to, halogen (e.g., chlorine, fluorine and bromine), formyloxy, acetoxy, propionyloxy, valeryloxy, stearoyloxy, benzoyloxy, naphthoyloxy, toluoyloxy, maleoyloxy, alkoxy, alkylthio, vinyloxy, allyloxy, vinyletheroxy, methacryloxy and acryloxy. These and other groups herein are defined according to the IUPAC Nomenclature Rules (1969). Preferably, the hydrolyzable groups X are independently an alkoxy group or a group containing ethylenic unsaturation. Preferably, the alkoxy group is a $C_1$-$C_6$ alkoxy, such as a methoxy, ethoxy, isopropoxy, n-butoxy, sec-butoxy, isobutoxy or tert-butoxy. Examples of hydrolyzable groups containing ethylenic unsaturation include, but are not limited to, vinyloxy, allyoxy, vinyletheroxy, methacryloxy and acryloxy. Preferably, the tetrasubstituted compound is a liquid, though it may be a solid soluble in the coating composition. Tetramethoxy silane and tetraethoxy silane may be purchased as tetramethyl orthosilicate and tetraethyl orthosilicate respectively, from the Aldrich Chemical Company of Milwaukee, Wis. or from Silbond Corporation under the trademark SILBOND.

One polysiloxane useful herein is illustrated by the formula:

wherein Y and Z are independently selected from the group consisting of halogen, amino, alkyl and alkoxy; n is one or more; and each X is as defined hereinbefore. As used herein the term "alkyl" shall mean a monovalent straight chain or branched chain group of carbon atoms including, but not limited to, methyl, ethyl, n-propyl, isopropyl, n-butyl, sec-butyl, isobutyl, tertbutyl and the like. As used herein the term "alkoxy" shall mean an alkyl group attached to the remainder of the molecule through an oxygen atom including, but not limited to, methoxy, ethoxy, isopropoxy, n-butoxy, sec-butoxy, isobutoxy, tert-butoxy and the like. Preferably, the alkyl portions of the alkoxy groups are lower alkyl groups, i.e., an alkyl group, branched or unbranched, cyclic or acyclic, having from 1 to 10 carbon atoms inclusive. Examples of lower alkyl groups include, but are not limited to, methyl, ethyl, propyl, isopropyl, butyl, pentyl and cyclohexyl. Most preferably, each alkyl group is methyl or ethyl. As used herein the term "lower alkoxy group" shall mean an alkyl group attached to the remainder of the molecule through an oxygen atom, where the alkyl group is a lower alkyl group. The siloxane main chain may be linear or branched, such that some Xs are alkoxy groups and some Xs are siloxane groups. Each alkoxy group may be the same or different. Preferably, the poly(siloxane) is a liquid, though it may be a solid soluble in the coating composition.

Multifunctional silanes comprise compounds which have a silane functionality and a second functional group including epoxy, amino, vinyl, isocyanate, isocyanurate, mercapto, acrylate, methacrylate groups and the like. Preferred adhesion promoters for adhesion to coated surfaces, such as those coated with a clear coat or a pigmented coating, include the (meth)acrylate alkoxy silanes, amino alkoxy silanes, vinyl alkoxy silanes, isocyanato alkoxy silanes, epoxyalkoxy silanes, mercapto alkoxy silanes and isocyanurate functional alkoxy silanes for instance. More preferred multifunctional silanes include gamma-glycidoxy-propyltrimethoxy silane, gamma-aminopropyltrimethoxy silane, gamma-isocyanatopropyltrimethoxy silane, n-beta-(aminoethyl)gamma-aminopropyl-trimethoxy silane, n-(2-aminoethyl)-3-aminopropyl-methyldimethoxy silane, 3-aminopropylmethyl-dimethoxy silane, 3-aminopropylmethyldimethoxy silane, bis-(gamma-trimethoxysilyl-propylamine), bis(triethoxysilyl)propyl amine, n-phenyl-gamma-aminopropyl-trimethoxysilane, gamma-isocyanatopropyl-methyldimethoxy silane, gamma-isocyanatopropyltriethoxy silane, beta(3,4-epoxy-cyclohexyl)ethyl-triethoxysilane, gamma-glycidoxypropylmethyldimethoxy silane, tris(gamma-trimethoxysilylpropyl)

isocyanurate, 3-acryloxypropyltrimethoxysilane, 3-methacryloxypropyltrimethoxysilane, vinyltriethoxysilane, or vinyltrimethoxysilane.

In another preferred embodiment, the adhesion promoter is a Michael addition product of siloxane further containing one or more active hydrogen containing functional moieties with two or more acrylate groups. The reaction product preferably has four or greater siloxy groups and more preferably 6 or greater. The reaction product preferably contains no active hydrogen atoms. The reaction products also preferably have at least one unsaturated group capable of reacting in the presence of free radicals. Preferably, the acrylate containing reactant is an alkoxylated polyol derived di or polyacrylate such as propoxylated neopentyl glycol diacrylate, propoxylated glyceryl triacrylate, or other polyacrylates such as hexanediol diacrylate, tripropylene glycol diacrylate, dipropylene glycol diacrylate, cyclohexanedimethanol diacrylate, alkoxylated cyclohexanedimethanol diacrylates, nonanediol diacrylate, tricyclodecane dimethanol diacrylate, cis/trans 1,3/1,4 cyclohexanedimethanol diacrylate, butanediol diacrylate, butylene glycol diacrylate, ditrimethylolpropane tetraacrylate, and the like. The Michael addition product is prepared by reacting the reactants at elevated temperatures of about 30° C. to about 60° C., preferably about 55° C. for a sufficient time such that all of the functional groups having active hydrogen atoms are reacted for instance, all amines are tertiary amines. Preferably, the reactants are reacted at elevated temperatures for greater than about 72 hours. It will be appreciated that one or more additives (e.g., a catalyst may be employed to accelerate the reaction time. For example, without limitation, a tertiary amine (e.g., in an amount of about 0.1 to about 3 parts by weight) may be employed in an instance when the composition uses a Michael addition product, such as 1,8 diazobicyclo[5.4.0]undec-7-Ene, (available from Aldrich under the designation DBU).

In another embodiment, the adhesion promoter is a high molecular weight adduct having multiple alkoxysilane moieties. Preferably, the adduct has 3 or greater alkoxysilane moieties and more preferably 6 or greater. Preferably, the adduct has a number average molecular weight of about 500 Da or greater and more preferably 1,000 Da or greater. The adduct preferably contains no reactive hydrogen containing moieties. In a preferred embodiment, the adduct is the reaction product of an epoxy silane, such as gamma propyl trimethoxy epoxy silane or gamma propyl triethoxy epoxy silane, with one or more silanes having reactive hydrogen containing moieties under conditions that an excess of epoxy equivalents is present as compared to active hydrogen containing moieties. Preferably, the equivalent ratio of epoxy moieties to active hydrogen containing moieties is about 1.1 or greater; and more preferably about 1.12. Preferably, the equivalent ratio of epoxy equivalents to active hydrogen containing moieties is about 1.14 or less. The preferred active hydrogen containing moieties are amine and mercapto with amine being most preferred. The epoxy silane active hydrogen containing silane reacted product is thereafter reacted with the reaction product of an aliphatic di- or polyisocyanate, such as tetramethylene diisocyanate (TMDI), and an active hydrogen functional moiety containing silane, for instance, an aminosilane or mercaptosilane. The two reaction products are reacted in a sufficient ratio such that the resulting adduct contains no active hydrogen atoms or isocyanate groups. The resulting adduct is added to the compositions in a sufficient amount to enhance the long term adhesion of the coating composition to substrates and adhesive systems. Preferably, the high molecular weight alkoxysilane containing adduct is present in an amount of about 1 part by weight or greater and more preferably about 5 parts by weight or greater of the coating. The high molecular weight alkoxysilane containing adduct is preferably present in an amount of about 15 parts by weight or less and more preferably about 10 parts by weight or less of the coating. The high molecular weight alkoxysilane adduct is preferably added to the coating composition of the invention in admixture with a reactive diluent as described hereinbefore. In a preferred embodiment, the adhesion promoter comprises a mixture of the Michael addition product containing alkoxysilane groups and the high molecular weight alkoxysilane adducts, preferably the two types of adducts are used in a ratio of about 1 to about 15 and more preferably about 1 to about 5.

When present, any adhesion promoters are preferably present in an amount of about 1, more preferably about 6, most preferably about 8, and still more preferably about 10 parts by weight or greater of the coating. Preferably, the adhesion promoter is present in an amount of about 30 and more preferably about 20 parts by weight or less of the coating.

The coating composition further typically comprises a compound reactive with the film-forming resin and containing an acidic moiety. Preferably, the acid group is a strong acid group; such strong acids include carboxylic acids, phosphoric acids, sulfuric acids and sulfonic acid groups. Mercapto or other sulfur containing acids may be employed. Preferred acid groups are carboxylic acid groups and phosphoric acid groups, such as phosphate acids. The most preferred acid groups are carboxylic acid groups. Moreover, it is preferred that the acid contains unsaturation (such as a double bond from an acrylate, methacrylate, vinyl, or allyl group) so that it can co-react with the other acrylate present in the coating. Among preferred classes of acid-containing compounds are acidic functional acrylates or (meth)acrylates, including methacrylic acids, acrylic acids, acrylated phosphate acid esters, mono-2-(methacryloxy)ethyl maleate mono-2-(methacryloyloxy)ethyl maleate, or phosphoric monoacrylate, maleic acids, itaconic acids, vinyl phosphonic acid, 2-sulfoethylmethacrylate, beta-carboxyethyl acrylate, 3-butenoic acid, 4-pentenoic acid, acrylamido glycolic acid, crotonic acid, tiglic acid, 2-(Trifluoromethyl)acrylic acid, dimethylacrylic acid, undecylenic acid, mixtures thereof and the like. The acid is present in a sufficient amount to enhance bonding to the glass or coated plastic and/or adhesive. The reactive acid-containing compound is present in the composition in an amount of about 1 and more preferably about 4 parts by weight or greater based on the coating composition. The reactive acid compound is preferably present in the composition in an amount of about 20, more preferably 10, and still more preferably about 8 weight parts or less of the coating.

In one embodiment the coating composition of the present invention may be substantially free of any added filler. However, the composition ordinarily will further comprise a filler, such as one or more of silicates, aluminas, zirconias, carbides, or any other fillers with high hardness (Mohs Hardness of greater than about 7), combinations thereof and the like. More preferred aluminas useful in the invention are alpha aluminas. Preferably, the fillers have a particle size of about 10 microns or less and most preferably 5 microns or less. When employed, filler is present in a sufficient amount to enhance the surface hardness and abrasion resistance and in an amount such that a homogeneous dispersion can be prepared. Thus it may be present in as little as about 5 parts by weight, to about 60 parts by weight of the coating, or as otherwise disclosed in co-pending application Ser. No. 11/472,119 filed Jun. 20, 2006 (priority to 60/692,318 filed Jun. 20, 2005), by Baikerikar et al. (incorporated by reference).

The composition may further comprise a catalyst or initiator capable of initiating cure of the film-forming resin under curing conditions. Preferably, those curing conditions are sufficient to cause formation of free radicals or cations. Preferred catalysts or initiators include photoinitiators which initiate free radical polymerization by the formation of free radicals or which generate cations, or thermal initiators which generate free radicals or which form or release cations when exposed to heat. Photoinitiator systems having a corresponding sensitivity to actinic radiation are normally incorporated into formulations containing compounds of the present invention and upon irradiation lead to the formation of reactive species capable of initiating polymerization. In one preferred embodiment, the initiator is a compound which when exposed to irradiation initiates free radical polymerization. Examples of photoinitiators include alpha aminoketones, alpha hydroxyketones, phosphine oxides, phenylglyoxalates, thioxanthones, benzophenones, benzoin ethers, oxime esters, amine synergists, maleimides, mixtures thereof and the like. Preferable photoinitiators include compounds in the following categories: phosphine oxides, ketones and their derivatives, benzophenones, carbocyanines and methines, polycyclic aromatic hydrocarbons, such as anthracene or the like, and dyestuffs, such as xanthenes, safranines and acridines. More generally, these are essentially chemical substances belonging to one of the following major categories: compounds containing carbonyl groups, such as pentanedione, benzil, piperonal, benzoin and its halogenated derivatives, benzoin ethers, anthraquinone and its derivatives, p,p'-dimethylaminobenzophene, benzophenone and the like; compounds containing sulfur or selenium, such as the di- and polysulfides, xanthogenates, mercaptans, dithiocarbamates, thioketones, beta-napthoselenazolines; peroxides; compounds containing nitrogen, such as azonitriles, diazo compounds, diazides, acridine derivatives, phenazine, quinoxaline, quinazoline and oxime esters, for example, 1-phenyl-1,2-propanedione 2-[0-(benzoyl)oxime]; halogenated compounds, such as halogenated ketones or aldehydes, methylaryl halides, sulfonyl halides or dihalides; phosphine oxides and photoinitiator dyestuffs, such as diazonium salts, azoxybenzenes and derivatives, rhodamines, eosines, fluoresceines, acriflavine or the like. Common photoinitiators include 2,2-diethoxyacetophenone, dimethoxyphenylacetophenone, phenyl benzoin, benzophenone, substituted benzophenones, phosphine oxides and the like. It is understood by those skilled in the art that when benzophenone and similar compounds are used as photoinitiators a synergistic agent, such as a tertiary amine or polymeric amine such as a secondary or primary amine terminated poly(propylene oxide) polyol are employed to enhance the conversion of photoadsorbed energy to polymerization-initiating free radicals.

The photoinitiators supply to the molecules containing unsaturation or to the initiator part of the energy transmitted by the light. By means of the unsaturated systems or of a photoinitiator, the photosensitizers produce free radicals or ions which initiate the polymerization or the cross-linking of the composition. It is also possible to use mixtures with known photoinitiators for example, mixtures with camphorquinone; benzophenone; benzophenone derivatives (e.g. 1-[4-(4-benzoyl-phenylsulfanyl)-phenyl]-2-methyl-2-(toluene-4-sulfonyl)-propan-1-one); acetophenone, acetophenone derivatives, for example, α-hydroxycycloalkyl phenyl ketones or dialkoxyacetophenones; α-hydroxy- or α-aminoacetophenones, for example, oligo-[2-hydroxy-2-methyl-1-[4-(1-methylvinyl)-phenyl]-propanone], 2-hydroxy-2-methyl-1-phenyl-propanone, 2-hydroxy-1-[4-(2-hydroxyethoxy)-phenyl]-2-methyl-propan-1-one, 2-methyl-1-[4-(methylthio)phenyl]-2-(4-morpholinyl)-propan-1-one, 2-dimethylamino-2-(4-methylbenzyl)-1-(4-morpholin-4-yl-phenyl)-butan-1-one, 2-benzyl-2-dimethylamino-1-(3,4-dimethoxy-phenyl)-butan-1-one, 2-benzyl-2-dimethylamino-1-(4-morpholin-4-yl-phenyl)-butan-1-one, 2-methyl-1-(4-methylsulfanyl-phenyl)-2-morpholin-4-yl-propan-1-one; 4-aroyl-1,3-dioxolanes; benzoin alkyl ethers and benzil ketals, for example, benzil dimethyl ketal, phenyl glyoxalates and derivatives thereof, for example, methylbenzoyl formate; dimeric phenyl glyoxalates, for example, oxophenyl-acetic acid 2-[2-(2-oxo-2-phenyl-acetoxy)-ethoxy]-ethyl ester; peresters, for example, benzophenonetetracarboxylic acid peresters, as described, for example, in EP 126 541 (U.S. Pat. No. 4,777,191 and U.S. Pat. No. 4,970,244 incorporated herein by reference); monoacylphosphine oxides, for example, (2,4,6-trimethylbenzoyl)-diphenylphosphine oxide or phenyl-(2,4,6-trimethylbenzoyl)-phosphinic acid ethyl ester, bisacylphosphine oxides, for example, bis(2,6-dimethoxybenzoyl)-(2,4,4-trimethyl-pent-1-yl) phosphine oxide, bis(2,4,6-trimethylbenzoyl)-phenyl-phosphine oxide or bis(2,4,6-trimethylbenzoyl)-(2,4-dipentoxyphenyl)phosphine oxide, trisacylphosphine oxides; halomethyltriazines, for example, 2-[2-(4-methoxy-phenyl)-vinyl]-4,6-bis-trichloromethyl-[1,3,5]triazine, 2-(4-methoxyphenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine; hexaarylbisimidazole/coinitiator systems, for example, ortho-chlorohexaphenyl-bisimidazole together with 2-mercaptobenzthiazole; ferrocenium compounds or titanocenes, for example, dicyclopentadienyl bis(2,6-difluoro-3-pyrrolo-phenyl)titanium; borate photoinitiators or O-acyloxime photoinitiators as described, for example, in GB 2,339,571 (U.S. Pat. No. 6,596,445 incorporated herein by reference).

It is also possible to add thermal free radical initiators, for example, benzoyl peroxide (other suitable peroxides are described in U.S. Pat. No. 4,950,581, column 19, lines 17-25), incorporated herein by reference or cationic initiators, such as aromatic sulfonium, phosphonium or iodonium salts, as described, for example, in U.S. Pat. No. 4,950,581, column 18, line 60 to column 19, line 10 incorporated herein by reference. An example of an iodonium salt is (4-isobutylphenyl)-4-methylphenyl-iodonium hexafluorophosphate. Maleimide derivatives, as described, for example, in U.S. Pat. No. 6,153,662 or U.S. Pat. No. 6,150,431 both incorporated herein by reference, may also be present. Examples which may be mentioned are N-(2-trifluoromethyl-phenyl)maleimide and N-(2-tert-butylphenyl)maleimide.

Among preferred classes of photoinitiators are alpha aminoketones, phosphine oxides, alpha hydroxyketones, benzophenones, mixtures thereof and the like. Among preferred photoinitiators are 1-hydroxycyclohexyl-phenylketone available from Ciba Geigy under IRGACURE 184, oligomeric alpha hydroxyketones, such as ESACURE ONE or KIP 150 from Lamberti, 2-benzyl 2-N-dimethylamino-1-(4-morpholinophenyl)-1-butanone available from Ciba Geigy under IRGACURE 369 or IRGACURE 379, and phosphine oxides available from BASF under LUCIRIN TPO, LUCIRIN TPO-L, LUCIRIN TPO-XL, or IRGACURE 819, IRGACURE 2100 from Ciba, mixtures thereof, such as SARCURE™ SR 1135 from Sartomer or ESACURE KTO 46 or TZT from Lamberti, which is a mixture of an alpha hydroxy ketone benzophenone derivatives and a phosphine oxide, and the like. Preferably, the catalyst or initiator is present in an amount of about 0.1, more preferably about 1, even more preferably about 2 and most preferably about 4 parts by weight or greater based on the weight of the coating composition. Preferably, the catalyst or initiator may be present in an amount of about 20, more preferably about 12, even more preferably about 10, and most preferably about 8 parts by weight or less based on the weight of the coating composition.

In one specific aspect of the invention the coating compositions of the invention cure by two mechanisms. First, they cure as a result of free radical polymerization of the unsaturated moieties or cationic polymerization. Further, they cure by silanol condensation. The silanol condensation proceeds upon exposure to atmospheric moisture. Silanol condensation is catalyzed by acid, base or organic metallic catalysts, as described in U.S. application Ser. No. 11/472,119 filed Jun. 20, 2006 (priority to 60/692,318 filed Jun. 20, 2005), by Baikerikar et al. (incorporated by reference). The compositions of the invention generally will contain acidic containing compounds and may contain amines which catalyze the reaction. Alternatively, a suitable moisture cure catalyst may be added.

The coating composition may further include one or more other ingredients, such as are disclosed in U.S. application Ser. No. 11/472,119 filed Jun. 20, 2006 (priority to 60/692,318 filed Jun. 20, 2005), by Baikerikar et al. (incorporated by reference) For example, among the additional optional ingredients that may be included in the coating composition are pigments, dyes, a dispersant or surfactant which stabilizes the dispersion of solid particles in the liquid medium and facilitates formation of a continuous void-free film, a surface active agent present to improve substrate wetting and the appearance of the coating, a defoamer and/or deaerator which prevents foaming or the formation of bubbles and which does not negatively impact the adhesive properties of the composition may be used, a polymerization inhibitor for preventing polymerization prior to exposure to curing conditions, compounds or polymers which improve the water resistance and/or adhesion of the composition to the substrate, colloidal silica acrylates for the purpose of improving hardness and abrasion resistance, a flexibilizer or rubber toughener can also be used to improve the flexibility and adhesion of the compositions, or any combination thereof.

It is contemplated that the coating compositions herein may be substantially free of any added pigment or dye. However, pigments or dyes useful in the invention may be organic or inorganic. Preferable inorganic pigments include black iron oxides, zinc oxide, cerium oxide, indium tin oxide, antimony-doped tin oxide, and titania ($TiO_2$), while preferable organic pigments include carbon black, phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines and mixtures thereof. Carbon black pigment is commercially available under the name of MOGUL from Cabot. A list of commercial pigments which are useful in the compositions of the invention are disclosed in U.S. Patent Application 2002/0086914 relevant portions incorporated herein by reference. For example, such pigments may include carbon black, black iron oxides, black IR-reflective pigments such as chromium green-black hematite, the like, or otherwise. If employed, the pigment or dye may be present in any suitable amount from about 1 to about 15 parts by weight of the coating (e.g., about 1, 2, 3, 5, 8, 12 or even 15 parts by weight).

If employed, examples of dispersants which may be used according to the invention include the anionic surfactants for example, lignosulfonates, dialkyl sulfosuccinates, sulfated or sulfonated fatty acids or fatty acid esters of fatty acids, reaction products of ethylene oxide and/or propylene oxide with saturated or unsaturated fatty acids, fatty alcohols, fatty amines, alicyclic alcohols or aliphatic-aromatic hydrocarbons which have been esterified in the terminal position by an inorganic oxygen-containing acid or a polybasic carboxylic acid. Useful dispersants include the following non-ionic surfactants: ethylene oxide adducts from the class of the addition products of ethylene oxide with higher fatty acids, saturated or unsaturated fatty alcohols, fatty amines, mercaptans, fatty acid amides, fatty acid alkylol amides or fatty amines or with alkylphenols or with alkylthiophenols, with from 5 to 100 mol of ethylene oxide being used per mole of the mentioned compounds, as well as ethylene oxide-propylene oxide block polymers and ethylene-diamine-ethylene oxide-propylene oxide adducts. These include: reaction products of saturated and/or unsaturated fatty alcohols having from 8 to 20 carbon atoms with from 20 to 100 mol of ethylene oxide per mol of alcohol, preferably saturated linear $C_{16}$-$C_{18}$ alcohols with from 25 to 80 mol, especially 25 mol, of ethylene oxide per mol of alcohol; reaction products of saturated and/or unsaturated fatty acids having from 8 to 20 carbon atoms with from 5 to 20 mol of ethylene oxide per mol of acid; reaction products of alkylphenols having from 7 to 12 carbon atoms with from 5 to 25 mol of ethylene oxide per mol of phenolic hydroxy group, preferably mono- or dialkylphenols with from 10 to 20 mol of ethylene oxide per mol of phenolic hydroxyl group; reaction products of saturated and/or unsaturated fatty acid amides having up to 20 carbon atoms with from 5 to 20 mol of ethylene oxide per mol of acid amide, preferably oleic acid amides with from 8 to 15 mol of ethylene oxide per mol of acid amide; reaction products of saturated and/or unsaturated fatty amines having from 8 to 20 carbon atoms with from 5 to 20 mol of ethylene oxide per mol of amine, preferably oleylamines with from 8 to 15 mol of ethylene oxide per mol of amine; ethylene oxide-propylene oxide block polymers having from 10 to 80 percent ethylene oxide and molecular weights from 1,000 to 80,000; ethylene oxide-propylene oxide adducts with ethylenediamine. Another useful class of dispersants are polymeric dispersants and protective colloids, including amphiphilic copolymers, block copolymers or graft or comb polymers, especially those based on acrylic acid, methacrylic acid or salts thereof, hydroxyalkyl(meth)acrylic acid, aminoalkyl(meth)acrylic acid or salts thereof, 2-acrylamido-2-methylpropanesulfonic acid (AMPS) or salts thereof, maleic anhydride or salts thereof, (meth)acrylamide or substituted (meth)acrylamides, vinyl heterocycles, for example vinylpyrrolidone, vinylimidazole, as well as amphiphilic polymers containing segments of (polyethylene oxide) PEO or EO/PO (ethylene oxide/propylene oxide) copolymers. Examples of suitable protective colloids are polyvinyl alcohol, polyvinylpyrrolidone or its copolymers. Also suitable are copolymers of synthetic monomers, especially of monomers having carboxyl groups, for example copolymers of 2-vinylpyrrolidone with 3-vinylpropionic acid or maleic acid copolymers and salts thereof.

Most preferred dispersants and surfactants include polymeric amide hyperdispersants available from Noveon under the trademark SOLSPERSE 32000 and 39000 and polypropylene oxide based ammonium salts, such as diethylpolypropoxy methyl ammonium chloride available from Degussa under the trademark and designation VARIQUAT CC-59 and diethyl polypropoxy 2-hydroxy ammonium phosphate available from Degussa under the trademark and designation VARIQUAT CC-42NS, and phosphate acid esters such as RHODAFAC RS-610 and RE 610 available from Rhodia, or unsaturated phosphate esters such as MAXEMUL 6106 and 6112 from Uniqema, and the like. Specific surfactant based dispersants are commercially available under the name of Disperbyk 2000 or Disperbyk 2001 from BYK-Chemie and particle based dispersants such as a modified silica, are commercially available under the name of AEROSIL R7200 from Degussa.

If employed, the dispersants may be used in any suitable amount, consistent with the teachings in U.S. application Ser. No. 11/472,119 filed Jun. 20, 2006 (priority to 60/692,318 filed Jun. 20, 2005), by Baikerikar et al. (incorporated by reference). For example, any dispersants and/or surfactants may be employed in an amount of about 0.5 parts by weight or greater based on the weight of the composition, and most preferably about 1.0 parts by weight or greater. The dispersant and/or surfactant are preferably used in an amount of about 10 parts by weight or less, and most preferably about 5 parts by weight or less based on the weight of the coating composition.

If employed, for surface active agents for improving substrate wetting and the appearance of the coating, any surface active agent which is useful in improving the substrate wetting and appearance of the coating may be used. Examples include surface active agents having limited influence on intercoat adhesion, such as polydimethyl siloxanes with low silicone content, silicone acrylates, siloxanes with various organic functional groups (such as carboxylic acid, amine, hydroxyl, acrylate, methacrylate, vinyl, epoxy, isocyanate, phosphonic acid, etc.) and silicone-free wetting agents/surfactants, mixtures thereof and the like. More preferred surface active agents include polyether modified polydimethylsiloxanes with low silicone content, silicone acrylates, and silicone-free wetting agents which do not affect intercoat adhesion, mixtures thereof and the like. One specific surface active agent includes one or more silicone acrylates, such as available from Tego Chemie (Degussa) under the trademark and designation TEGO RAD 2100, 2200N, 2250 and 2300 or the BYK UV 3500 series (3500, 3510, 3530, 3570) available from BYK Chemie, or siloxanes with various organic functional groups available under the SILMER series from Siltech Corporation, or one or more polyacrylates, such as Modaflow from UCB. The surface active agents are present in the composition in a sufficient amount to improve the surface appearance of the coating, substrate wetting and leveling. Preferably, the surface active agents are present in an amount of about 0.05 parts by weight or greater, even more preferably about 0.1 parts by weight or greater and most preferably about 0.2 parts by weight or greater based on the weight of the composition. The surface active agent is preferably present in an amount of about 1 part by weight or less, more preferably about 0.5 parts by weight or less based on the weight of the coating composition.

Any defoamer and/or deaerator which prevents foaming or the formation of bubbles and which does not negatively impact the adhesive properties of the composition may be used. Preferable defoamers are silicone defoamers, silicone free defoamers, polyacrylate defoamers, mixtures thereof and the like. More preferred defoamers include FOAM BLAST™ 20 F FOAM BLAST™ 30 and FOAM BLAST™ 550 polyacrylate defoamers available from Lubrizol; TEGO AIREX™ 920 polyacrylate defoamer and TEGO AIREX™ 980, from Degussa, SILMER ACR Di-10 and ACR Mo-8 polydimethylsiloxane acrylate copolymer from Siltech Corporation, or FOAMEX N™ silicone based defoamers available from Degussa or BYK 1790 silicone-free defoamer from BYK Chemie. The defoamer/deaerator is present in the compositions of the invention in a sufficient amount to prevent formation of bubbles and/or foam, e.g., in an amount of about 0.05 parts by weight or greater based on the weight of the coating composition, and more preferably about 0.1 part by weight or greater. It is also possible to employ the defoamer/deaerator in an amount of about 1.0 part by weight or less based on the weight of the composition.

Any polymerization inhibitor which prevents polymerization of the functional groups contained in the composition may be used. Where the functional groups polymerize when exposed to free radicals, hydroquinones, phenothiazines (most preferable), mixtures thereof or the like may be used. Specific examples of polymerization inhibitors include 4-methoxyphenol(MEHQ), hydroquinone (HQ), 2,6-Di-tert-butyl-4-methylphenol, i.e. butylated hydroxytoluene (BHT), phenothiazine, 2,2,6,6-Tetramethyl-4-hydroxypiperidine-1-oxyl, such as XENOXYL available from Avecia, 2,2,6,6-tetramethylpiperidinyl-1-oxide (TEMPO), IRGASTAB UV 10 from Ciba, ADDITIVE™ 01-468 or GENORAD™ 16 available from Rahn. Preferably, the polymerization inhibitor is present in an amount of about 0.01 weight parts or greater, more preferably about 0.05 weight parts or greater, and most preferably about 0.1 weight parts or greater based on the weight of the coating composition. Preferably, the polymerization inhibitor is present in an amount of about 2 and more preferably about 1 parts or less based on the weight of the coating composition.

Among compounds for improving water resistance and/or adhesion of the composition to the substrate are polybutadiene acrylates, silyated polymers (such as the reaction products of isocyanatosilanes and hydroxy functional acrylates or aminosilanes and multifunctional acrylates). To improve weatherability, the following components may be added: hindered amine light stabilizers, such as TINUVIN™ 123,152, 292, or 5100 from Ciba Geigy or SANDUVOR™ TB-02 or 3058 from Clariant, ultraviolet absorbers or stabilizers such as TINUVIN™ 400, 479, R600, R796 or 1130 available from Ciba Geigy, SANDUVOR™ PR-31 available from Clariant or HOMBITEC™ RM 300 available from Sachtleben. The compositions may further include antioxidants, such as IRGANOX™ 1035 or 1076 from Ciba Geigy or ETHANOX™ 376 and ETHAFOS™ 368 from Albemarle. The compositions also may include moisture scavengers to improve the hydrolytic stability of the composition. Any moisture scavenger known in the art which does not interfere with the functioning of the composition may be used. Among preferred moisture scavengers are vinyltrimethoxysilane, oligomeric vinyltrimethoxysilane (such as DYNASYLAN 6490 from Degussa), triethylortho-formate, triethylorthoacetate and molecular sieve powders such as SYLOSIV™ M from Grace Davison.

Among preferred colloidal silica acrylates are silica nanoparticle dispersions in acrylates such as isobornyl acrylate, hexane diol diacrylate, tripropylene glycol diacrylate propoxylated neopentyl glycol diacrylate propoxylated glyceryl triacrylate or acrylate oligomers. Such dispersions are available from Clariant under HIGHLINK NANO and from Hanse-Chemie under NANOCRYL. Colloidal alumina nanoparticle dispersions in acrylate monomers, such as NANODUR from Nanophase Technologies, or NANOBYK from BYK-Chemie could also be used. In addition, polyethylene, polytetrafluoroethylene or polypropylene wax dispersions in acrylate monomers, such as the EVERGLIDE or S-390 or SST series of products from Shamrock Technologies, or polyamide particles such as ORGASOL from Arkema, or montan wax with reactive acrylate groups, such as Ceridust TP 5091 from Clariant could be used to further improve scratch resistance and scuff/rub resistance. Alternatively, the wax can be added in powder form. The wax dispersions are preferably present in an amount of about 0.5 parts by weight or greater and preferably about 1 or greater. The wax dispersion is present in an amount of about 10 parts by weight or less, preferably 5 parts by weight or less of the coating.

Examples of flexibilizers are thermoplastic acrylic bead resins such as ELVACITE™ thermoplastic acrylic bead resins from Lucite (Ineos Resins) or HYCAR liquid butadiene resins from Noveon.

The coating composition preferably has a viscosity which allows it to be processed for application to a substrate. The specific viscosity that may be used will be dictated by the application method. For instance, formulations for screen printing will require much higher viscosity than formulations used for ink jet printing. For example, if the composition is applied by screen printing the coating composition typically has a viscosity of about 2,000 centipoises or greater and more preferably about 5,000. Preferably, the coating composition has a viscosity of 50,000 centipoise or less. If the coating composition is applied by ink jet printing, the composition has a viscosity of 5 centipoises or greater. Preferably, the coating composition has a viscosity of 50 centipoises or less. If the coating composition is applied by spraying it onto the substrate, the composition has a viscosity of 5 centipoises or greater. Preferably, the coating composition has a viscosity of 100 centipoises or less.

The coating composition of the invention may be prepared by contacting the ingredients and blending, using art-disclosed techniques. In one preferred approach, the materials are contacted under conditions such that a stable homogeneous dispersion is prepared. The materials may be contacted at about ambient temperature (about 20-25° C.) to about 60° C. and preferably at ambient temperature. The components may be blended in air and preferably blended in a dry environment to improve the hydrolytic stability of the composition. Preferably, the materials are blended for about 60 minutes or greater, more preferably about 90 minutes or greater. Preferably, the materials are blended for a period of about 240 minutes or less and more preferably about 180 minutes or less. The coating composition optionally may be subjected to a grinding step. This grinding may occur in any equipment known to those skilled in the art for performing such grinding (i.e. ball milling, horizontal or vertical media milling, sand or pebble milling, etc). Preferably, the composition is stored in a dry environment.

The coating composition may be applied to a substrate (e.g., glass or coated plastic) using any art-disclosed means, such as using a brush, roller, sprayed onto the surface, ink jet printing, screen printing and the like. It may be applied using art-disclosed robotic application devices (e.g., one having at least 2 axes of motion). After application of the coating composition to the surface of the substrate, it is exposed to polymerization conditions, such as one or more operations which causes the catalyst or initiator to initiate the formation of free radicals and free radical polymerization. In a preferred embodiment, the catalyst or initiator is a photoinitiator and polymerization is initiated by exposing the composition to irradiation, such as ultraviolet light or electronic beam. The energy source used for achieving crosslinking of the radiation functionality may be actinic (e.g the radiation having a wavelength in the ultraviolet or visible region of the spectrum), accelerated particles (e.g., electron beam radiation), thermal (e.g., heat or infrared radiation), or the like. Preferably, the energy source is actinic radiation or accelerated particles, because such energy source provides excellent control over the initiation and rate of crosslinking. Additionally, actinic radiation and accelerated particles can be used for curing at relatively low temperatures. Suitable sources of actinic radiation include mercury lamps, electrodeless lamps, xenon lamps, carbon arc lamps, tungsten filament lamps, lasers, electron beam energy, sunlight, and the like. Ultraviolet radiation, especially from xenon lamps, medium pressure mercury lamps or electrodeless lamps is most preferred.

Furthermore, it is contemplated that in addition to the coating composition, the present invention may optionally include a frit (e.g., ceramic frit). As such, it is appreciated that the coating composition may be utilized in place of the frit or in combination therewith. For example, the coating composition, the frit, or a combination thereof may be capable of blocking transmission of light to prevent it from contacting the adhesive, which bonds the window into a structure. Such coating, frit, or a combination thereof on the periphery may be also capable of hiding trim components disposed about the periphery of the window.

In a specific embodiment, the invention is encapsulated glass or abrasion resistant coated plastic having a cured coating composition of the invention deposited on the surface. The glass or plastic can be flat or shaped, e.g., for defining a curved surface. One aspect of the present invention contemplates applying the coating composition to a substrate and thereafter shaping and encapsulating the substrate. Optionally, or as an alternative, applying the coating composition onto a substrate that has been shaped prior to the application of the coating composition and encapsulation. Glass or coated plastic with a coating of the invention can be used for any use for which glass or coated plastic is known to be used by one skilled in the art. Preferably, the glass or coated plastic is used as a window and the coating is found on the periphery of the window (e.g., as part of an encapsulation joint). In one aspect the coating composition herein is applied about the periphery of the window such that it is capable of blocking transmission of light to prevent it from contacting the adhesive, which bonds the window into a structure. Such coating on the periphery also hides the trim components disposed about the periphery of the window. It is also possible that a conventional ceramic frit is employed on the periphery, or an organic frit of the type disclosed in co-pending U.S. patent application Ser. No. 11/472,119 filed Jun. 20, 2006 (priority to 60/692,318 filed Jun. 20, 2005), by Baikerikar et al. (incorporated by reference). Accordingly, for use as a peripheral frit, desirably, the any such coating exhibits an ultraviolet light transmission of about 1 percent or less of the light to which the coating is exposed to and more preferably about 0.5 percent or less.

In one preferred embodiment, the substrate herein is glass that is curved, and more preferably, the glass is pre-shaped prior to application of the coating composition herein. Preferably the cured coating composition demonstrates an abrasion resistance such that after 500 cycles according to ASTM D1044 test the coating retains a light transmittance of less than 1 percent. Preferably, the coating demonstrates an abrasion resistance of about Δ(delta) percent T<1 percent, more preferably about Δ(delta) percent T<0.75 percent, and most preferably about Δ(delta) percent T<0.5 percent, as determined according to the test ASTM D1044.

Figure 1:
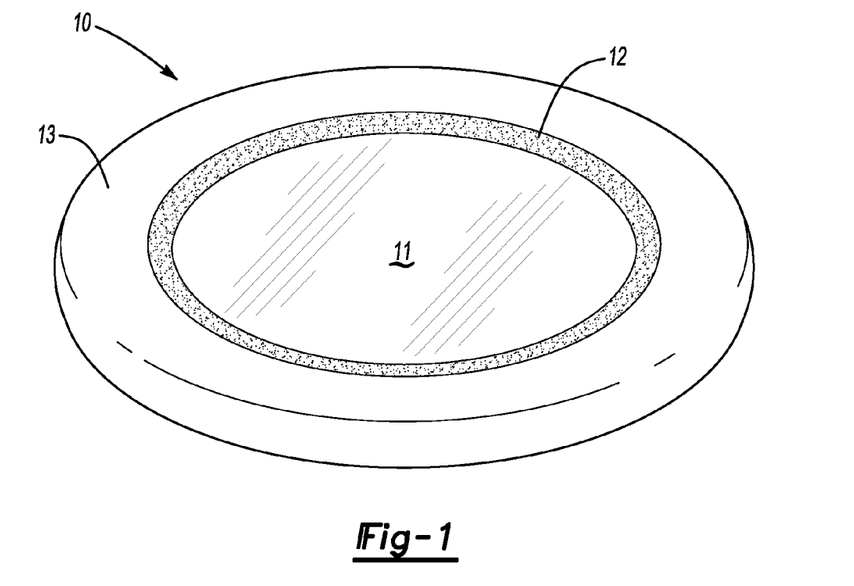
FIG. 1 is a plan view of an illustrative encapsulated panel.
Figure 2:
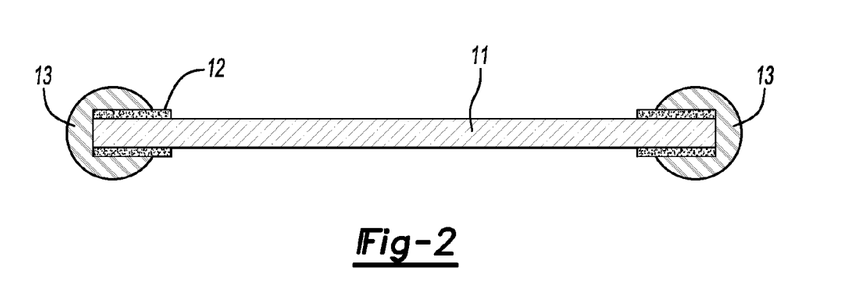
FIG. 2 is a side sectional view of a panel like that of FIG. 1.

The substrates herein are preferably used as a window and more preferably used as a window in an automobile. FIGS. 1 and 2 illustrate a window assembly (10) according to the invention. FIG. 1 further illustrates a window (11) with the coating composition (12) located about the periphery of the window (11). The coating is shown to have a visible portion. However, it may be completely covered by the plastic (13). The plastic member (13) may be applied (e.g., as a frame for surrounding the window), over the coating composition. The assembly (10) is installed in an opening of an automotive vehicle.

Figure 3:
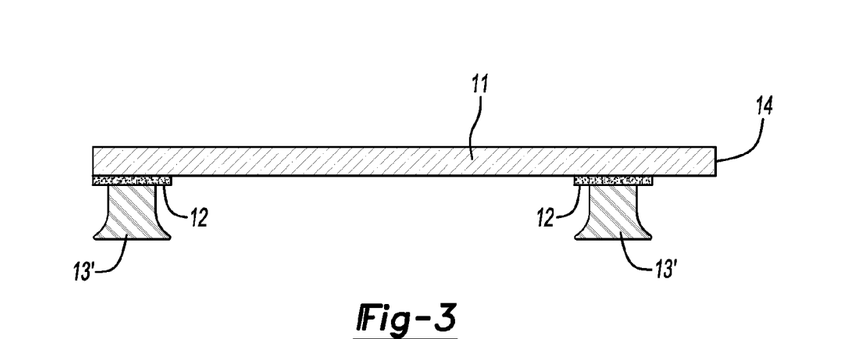
FIGS. 3, 4a and 4b are additional side section views of illustrative panels.

FIG. 3 shows an alternative example in which a plastic member (13') is located on only one face of the window (11). FIG. 3 also illustrates how the coatings herein may be applied proximate an edge (14) (or even toward a central portion of the substrate), and need not be applied to necessarily abut the edge (14) of the substrate.

Figure 4A:
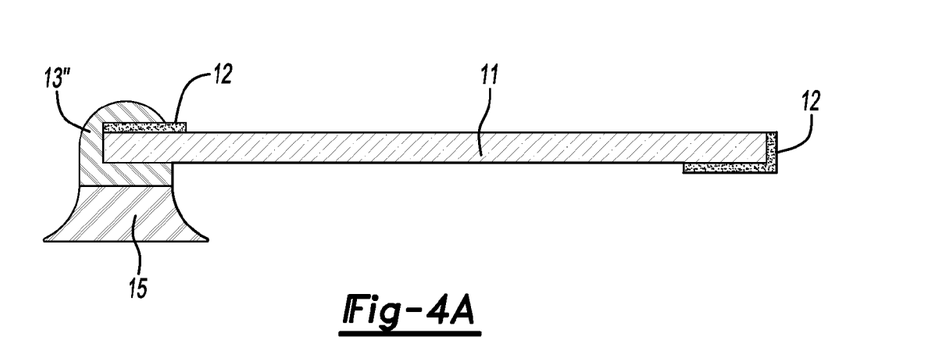
Figure 4B:
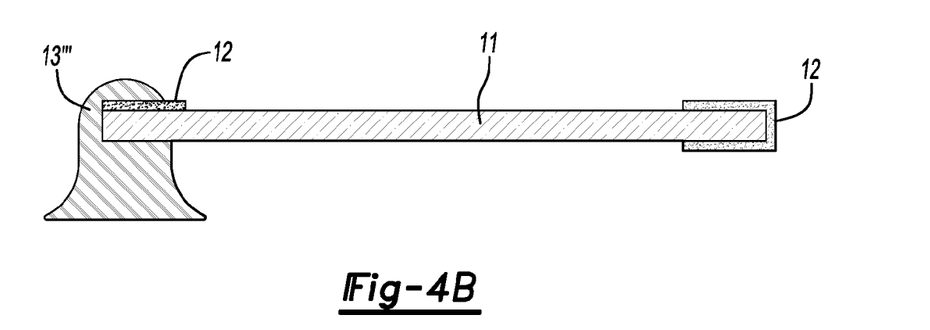

Referring to FIGS. 4a and 4b, suitable plastic members (13") may be configured to include a separate seal element (15) (e.g., a thermoplastic or thermoset rubber seal that is attached to the plastic). It may include an integral seal element portion formed on the plastic member 13'''.

It is seen from the examples of the drawings how the coating may be applied to a substrate herein in any of a variety of locations, including for example on a single face of the substrate, on opposing faces of the substrate, on one or both opposing faces of the substrate and along an edge, or any combination thereof. Thus, the configurations of the drawings may be combined with each other. Further, the profiles of the plastic depicted in the drawings are not intended as limiting. The profiles may be solid, hollow, porous, or otherwise. Though they generally will be formed in place on the substrate, it is also possible they will be pre-fabricated and thereafter attached to the substrate. As also taught herein, the assemblies may include additional hardware not shown in the drawings.

Figure 5:
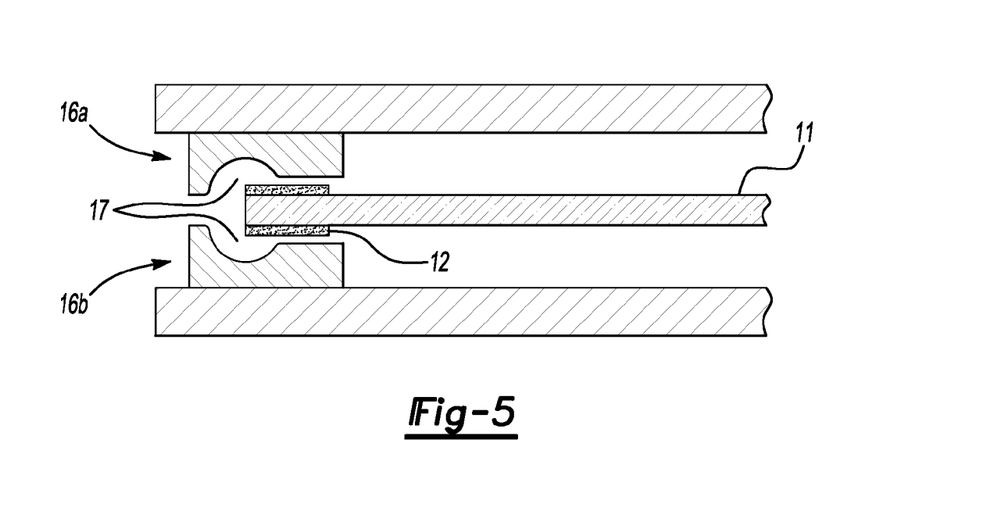
FIG. 5 is a side view of an illustrative mold tool in an open position.

FIG. 5 illustrates one possible approach for encapsulation of a substrate. By way of example, a substrate (e.g., window 11 with coating 12 proximate its edge) is inserted between opposing mold portions (16a) and 16(b). A cavity (17) is defined in the space between the mold portions, when brought together, and the substrate. Plastic is introduced into that cavity. After the plastic has solidified, the mold portions can be separated and the assembly removed.

Features shown in one of the Figures may be interchanged with corresponding features as shown in other Figures. The skilled artisan will appreciate that the plastic of the encapsulation joint may be on at least one, two, three or four sides of the article. Thus, the plastic may be on one face of a substrate, one face and an edge, or even both faces and an adjoining edge. The plastic may be prefabricated and applied to the substrate thereafter, formed in-situ or both. The plastic may be a composite that comprises one or more materials that are layered relative to each other, interspersed among each other, or otherwise employed as a composite. The resulting profile of the plastic may be from a mold cavity, from an die (e.g., an extrusion die), or otherwise.

It is also possible that the assemblies herein may be secured in place (e.g., in an opening of an automotive vehicle) by use of an adhesive. For example an adhesive bead may be located about the periphery of the assembly, such as in contact with the plastic members (13/13'/13"/13'''). The adhesive bead located about the periphery of the window can be any known adhesive bead useful in bonding windows into structures. In one embodiment, the adhesive can be an isocyanate functional, siloxy functional or combination of isocyanate and siloxy functional adhesive which cures when exposed to moisture. The system of the invention can utilize any isocyanate functional adhesive which is designed for bonding to non-porous surfaces such as metal, coated plastic and/or glass. Examples of useful adhesive systems are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,976,305, U.S. Pat. No. 5,852,137, U.S. Pat. No. 6,512,033, relevant portions incorporated herein by reference. Examples of commercial adhesives which may be used herein are BETASEAL™ 15630N, 15625N, 15845N adhesives available from The Dow Chemical Company. EFBOND™ windshield adhesives available from Eftec, WS151™, WS212™ adhesives available from Yokohama Rubber Company, and SIKAFLEX™ adhesives available from Sika Corporation.

It is contemplated that the adhesive may be based upon one or more of polymeric component (e.g., an isocyanate terminated prepolymer or other polymer), and which may include a pigment, a catalyst (e.g., a catalyst including Morpholine, 4,4'(oxydi-2,1-ethanediyl)bis(DMDEE)), or other ingredient (e.g., filler, such as clay, one or more silanes (e.g., an epoxy silane)) and employed as OEM adhesives, aftermarket adhesives, otherwise, or any combination thereof. Accordingly, a modified silicone (MS) polymer based adhesive such as Kaneka adhesives may be utilized. One type of Kaneka adhesive may include one or more of SAX 400 polymer, Siliquest (A-1170), carbon black, U220 tin catalyst, UV & heat stabilizer package, the like, or otherwise.

Another adhesive such as Betaseal U-418 (HV) may be utilized being formed from a mixture of one or more of isocyanate terminated prepolymer, carbon black, DMDEE catalyst (e.g.,), the like, or otherwise and combinations thereof. Additionally, another adhesive such as Betaseal Express may be utilized and formed from a mixture of one or more of isocyanate terminated prepolymer, carbon black and clay, DMDEE/Bismuth Octiate, 0.25% Silquest A-187 (epoxy silane), the like, or otherwise and combinations thereof. Furthermore, another adhesive such Betaseal One may be utilized and formed from a mixture of one or more of isocyanate terminated prepolymer, polyester based prepolymer, carbon black and clay, DMDEE/Bismuth Octoate, 0.25% Silquest A-187 (epoxy silane), the like, or otherwise and combinations thereof.

Another aspect of the invention also contemplates a step of recycling a substrate including a coating composition thereon. The coating composition can be removed from the substrate and the coating composition (or constituents thereof) reclaimed, the substrate material reclaimed or both.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. References to an acrylic or (meth)acrylic (or derivative terms such as "acrylate") contemplate meth-acrylics and acrylics (and corresponding derivative terms). Ingredients discussed herein may form part of the resulting composition. However, they also may form part of the adhesion promotion additive. For example, it is possible that the adhesion promotion additive is a vehicle for delivering an ingredient into an admixture for forming the resulting composition.

The invention claimed is:

1. A panel assembly, comprising:
   a) a substrate comprising a panel of glass, plastic or a combination thereof which is at least partially transparent;

b) a cured coating on at least one peripheral edge portion of the substrate for defining a coated edge portion, the coating including:
  i) one or more film forming resins having at least one functional group capable of polymerization;
  ii) an initiator for causing the formation of free radicals or cations; and
  iii) one or more compounds, which are reactive with the film forming resin and which also contain at least one acidic moiety consisting of a carboxylic acid group and a double bond, selected from the group consisting of acrylate, methacrylate, vinyl and allyl group containing compounds; and
  iv) one or more adhesion promoters comprising a Michael addition product of a compound containing three or greater alkoxysilyl groups and an amino group with a compound containing two or more acrylate groups, and
c) a plastic bonded onto the coated edge portion of the substrate, the assembly being free of any ceramic frit beneath the plastic, wherein the substrate is encapsulated by the plastic about the entire periphery of the substrate.

2. The panel assembly of claim 1, wherein the coating includes:
  a) from about 10 to about 70 parts by weight of the one or more of the film forming resin;
  b) from about 2 to about 30 parts by weight of one or more reactive diluents;
  c) from about 1 to about 30 parts by weight of one or more of the adhesion promoter;
  d) from about 1 to about 10 parts by weight of one or more of the compounds containing at least one acidic moiety; and,
  e) from about 2 to about 20 parts by weight of one or more of the initiators;
  wherein the coating contains 100 parts.

3. The panel assembly of claim 2, wherein the coating is one cured upon exposure to ultraviolet light.

4. The panel assembly of claim 2, the assembly being substantially free of a separate primer.

5. The panel assembly of claim 1, wherein:
  a) the substrate includes a peripheral edge portion that surrounds a generally transparent central portion,
  b) the coating includes a film forming resin containing (meth)acrylate functionality and a photoinitiator; and
  the plastic bonded to the coated edge portion of the substrate is selected from a polyurethane, a polyvinylchloride, a thermoplastic polyolefin, a polyolefin, or any combination thereof, and being molded onto the coated edge portion of the substrate, the assembly being free of a separate primer.

6. The assembly according to claim 1 wherein the substrate is a thin panel having generally opposing parallel outer surfaces that are flat, arcuate, or a combination of both.

7. The assembly according to claim 6 wherein the substrate comprises glass or abrasion resistant coated plastic.

8. The assembly according to claim 1 wherein the coating further comprises one or more fillers having a Mohs hardness of greater than about 7.

9. The assembly according to claim 1 wherein the adhesion promoter is a Michael Addition Product having six or greater alkoxysilane groups.

10. The assembly according to claim 1 wherein the adhesion promoter is a Michael Addition product comprising the reaction product of an amino silane and a polyacrylate.

11. A method of making a panel assembly, comprising the steps of:
  a) applying a coating on at least one peripheral edge portion of a substrate, comprising a panel of glass, plastic or a combination thereof which is at least partially transparent, for defining a coated portion, the coating including:
    i) one or more film forming resins having at least one functional group capable of polymerization;
    ii) an initiator for causing the formation of free radicals or cations;
    iii) one or more compounds, which are reactive with the film forming resin and which also contain at least one acidic moiety consisting of a carboxylic acid group and a double bond, selected from the group consisting of acrylate, methacrylate, vinyl and allyl group containing compounds; and
    iv) one or more adhesion promoters comprising a Michael addition product of a compound containing three or greater alkoxysilyl groups and an amino group with a compound containing two or more acrylate groups,
  b) curing the coating;
  c) positioning the substrate in a fixture for exposing the at least one portion; and
  d) securing a plastic onto the coated peripheral edge portion of the substrate, wherein the substrate is encapsulated by the plastic about the entire periphery of the substrate.

12. The method of claim 11, wherein the securing step includes reaction injection molding the plastic.

13. The method of claim 12, wherein the plastic secured to the coated peripheral edge of the substrate is a polyurethane.

14. The method of claim 13, wherein the plastic is initially contacted with the coating as precursor reactants in a liquid state.

15. The method of making a panel assembly of claim 11, wherein:
  a) the applying step, the coating includes a film forming resin containing (meth)acrylate functionality;
  b) the curing step is achieved by radiation;
  c) in the positioning step, the substrate is at least partially in a mold assembly for exposing the at least one portion within a cavity of the mold assembly; and
  d) the securing step is achieved by contacting the plastic in a liquid state with the coated portion of the substrate in the mold cavity; and solidifying the plastic for at least partially covering the coated portion.

16. The method according to claim 11 wherein the coating further comprises one or more fillers having a Mohs hardness of greater than about 7.

17. The method according to claim 11 wherein the adhesion promoter is a Michael Addition product comprising the reaction product of an amino silane and a polyacrylate.

* * * * *